(12) United States Patent
Takizawa et al.

(10) Patent No.: US 8,995,089 B2
(45) Date of Patent: Mar. 31, 2015

(54) MAGNETIC RECORDING MEDIUM AND METHOD FOR PRODUCING THE SAME

(71) Applicant: Kabushiki Kaisha Toshiba, Minato-ku, Tokyo (JP)

(72) Inventors: Kazutaka Takizawa, Kawasaki (JP); Akira Watanabe, Kawasaki (JP); Kaori Kimura, Yokohama (JP); Tsuyoshi Onitsuka, Hino (JP); Takeshi Iwasaki, Inagi (JP); Masahiro Takashita, Kawasaki (JP); Akihiko Takeo, Kokubunji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/944,645

(22) Filed: Jul. 17, 2013

(65) Prior Publication Data

US 2014/0247519 A1 Sep. 4, 2014

(30) Foreign Application Priority Data

Mar. 1, 2013 (JP) .................................. 2013-041233

(51) Int. Cl.
*G11B 5/65* (2006.01)
*G11B 5/72* (2006.01)
*G11B 5/855* (2006.01)

(52) U.S. Cl.
CPC . *G11B 5/72* (2013.01); *G11B 5/855* (2013.01)
USPC ......................................................... 360/135

(58) Field of Classification Search
USPC ...................................................... 360/245.4
See application file for complete search history.

(56) References Cited

U.S. PATENT DOCUMENTS

| | | | |
|---|---|---|---|
| 7,983,004 B2* | 7/2011 | Shirotori et al. .............. | 360/135 |
| 8,300,340 B2* | 10/2012 | Sakurai et al. ................. | 360/48 |
| 8,315,018 B2* | 11/2012 | Fukushima et al. .......... | 360/135 |
| 8,318,331 B2* | 11/2012 | Sakurai et al. ............... | 428/836 |
| 8,440,091 B2* | 5/2013 | Kimura et al. ................. | 216/22 |
| 8,634,153 B2* | 1/2014 | Maeda et al. ................... | 360/48 |
| 2012/0067844 A1 | 3/2012 | Kamata et al. | |
| 2013/0004661 A1 | 1/2013 | Sakurai | |

FOREIGN PATENT DOCUMENTS

| | | |
|---|---|---|
| JP | 04-038620 | 2/1992 |
| JP | 2007-026558 | 2/2007 |
| JP | 2007-276104 | 10/2007 |
| JP | 2009-158059 | 7/2009 |
| JP | 2009-295212 | 12/2009 |
| JP | 2010-192016 | 9/2010 |
| JP | 2012-064289 | 3/2012 |

\* cited by examiner

*Primary Examiner* — Mark Blouin
(74) *Attorney, Agent, or Firm* — Knobbe Martens Olson & Bear LLP

(57) ABSTRACT

According to one embodiment, there is provided a magnetic recording medium which includes a base, a magnetic recording layer having convex-shaped magnetic layers, which is formed on the base, and a protective film formed on the magnetic recording layer. There are gaps in a region surrounded by the protective film, the surface of the base, and each side wall of each magnetic layer.

20 Claims, 18 Drawing Sheets

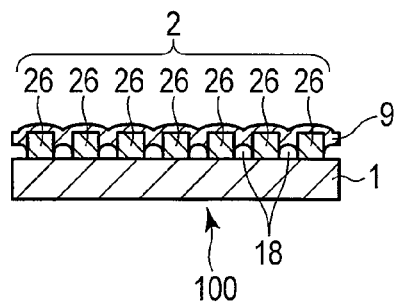
F I G. 1
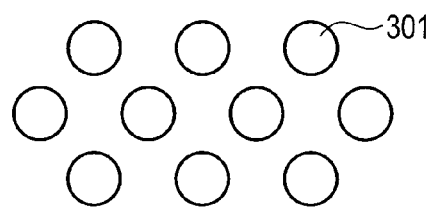
F I G. 2A
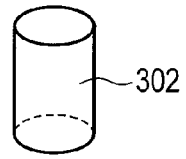
F I G. 2B
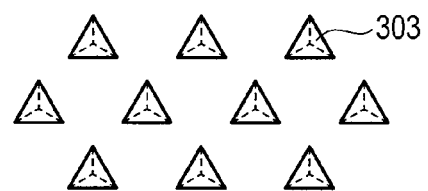
F I G. 3A
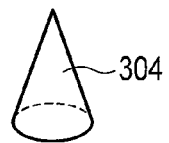
F I G. 3B
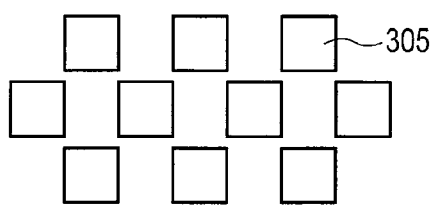
F I G. 4A
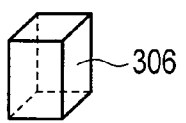
F I G. 4B

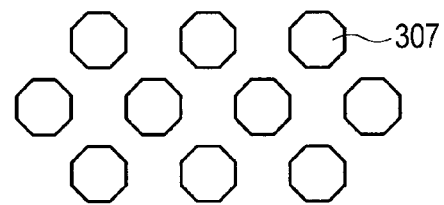
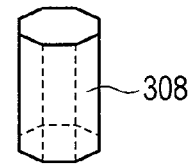
FIG. 5A
FIG. 5B
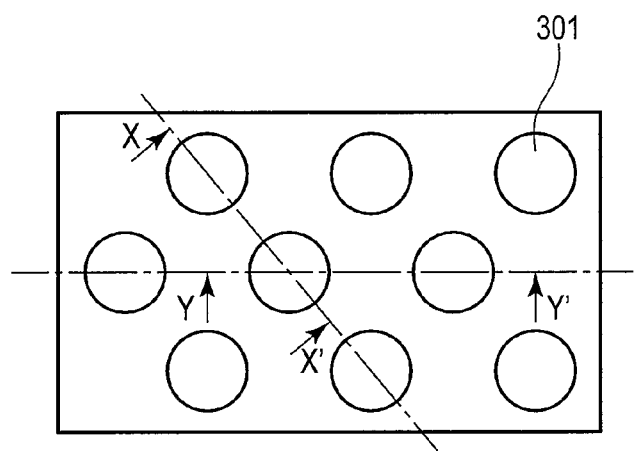
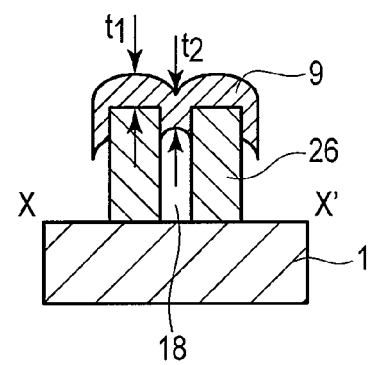
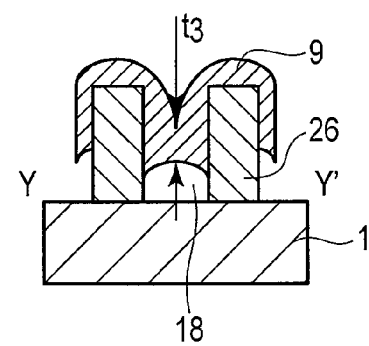
FIG. 6A
FIG. 6B
FIG. 6C

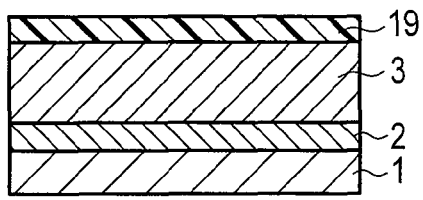
FIG. 9A
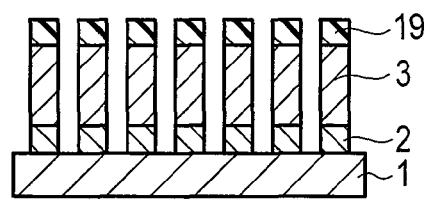
FIG. 9D
FIG. 9E
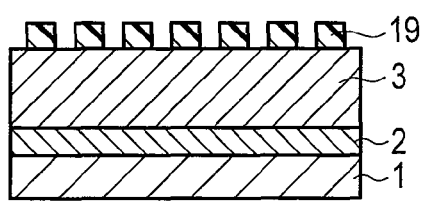
FIG. 9B
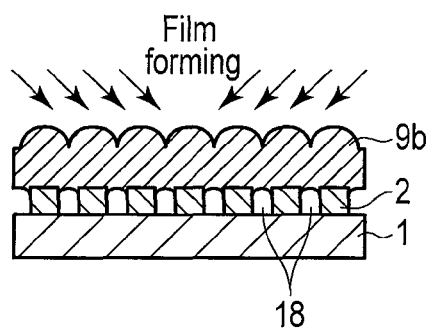
FIG. 9F
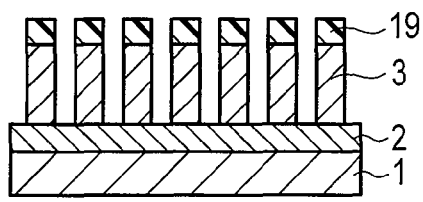
FIG. 9C
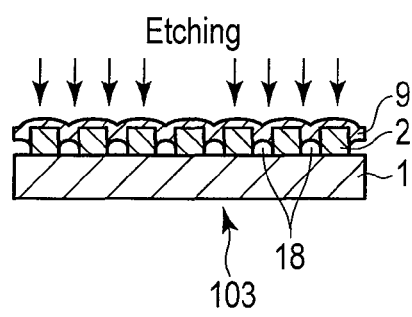
FIG. 9G

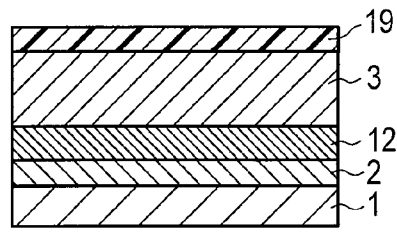
F I G. 12A
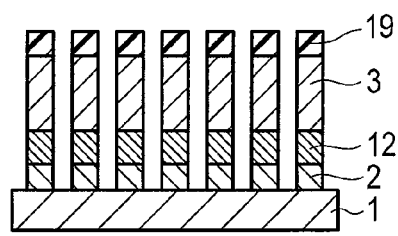
F I G. 12E
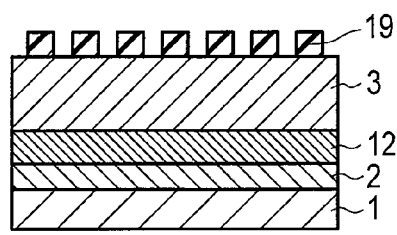
F I G. 12B
F I G. 12F
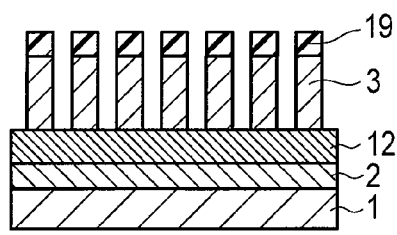
F I G. 12C
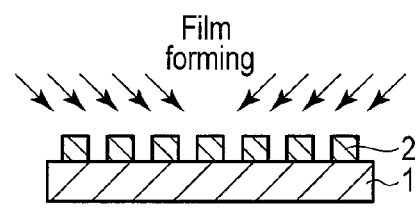
F I G. 12G
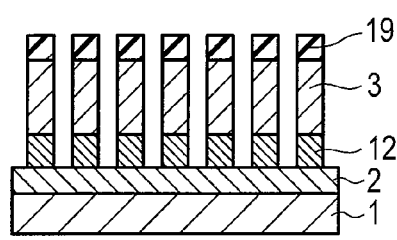
F I G. 12D
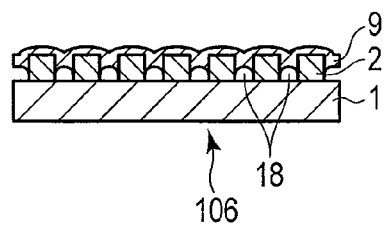
F I G. 12H

F I G. 13A
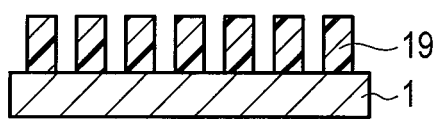
F I G. 13B
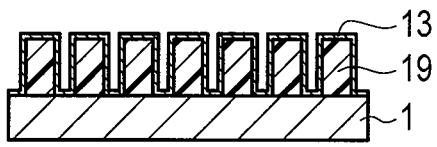
F I G. 13C
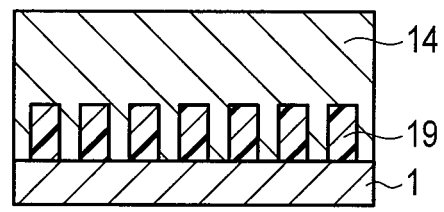
F I G. 13D
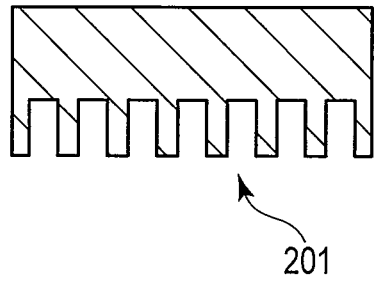
F I G. 13E

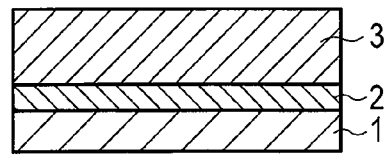
F I G. 16A
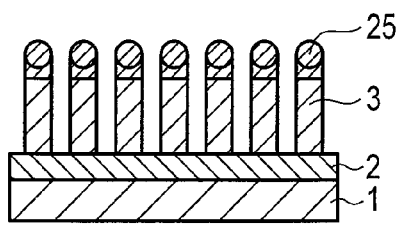
F I G. 16E
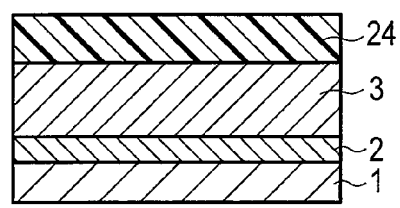
F I G. 16B
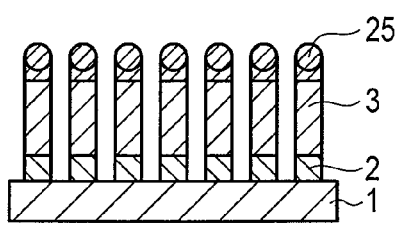
F I G. 16F
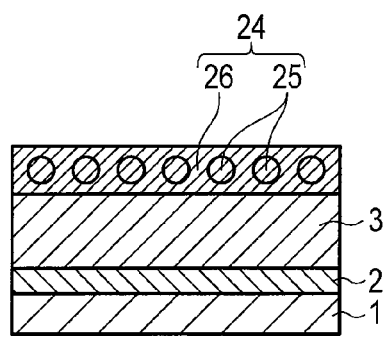
F I G. 16C
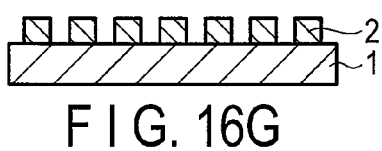
F I G. 16G
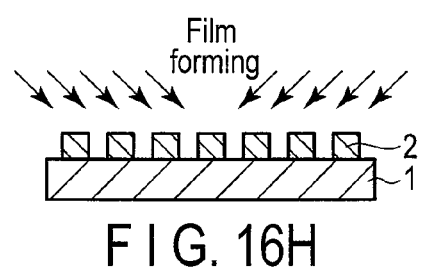
F I G. 16H
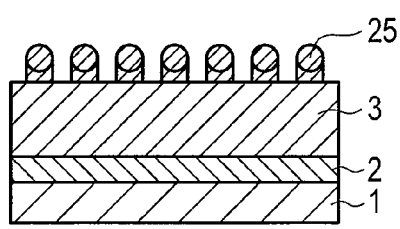
F I G. 16D
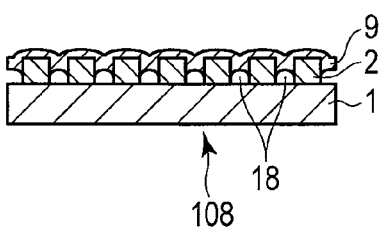
F I G. 16I

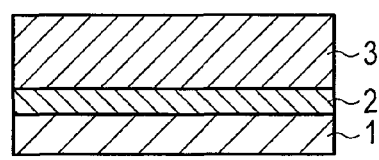
F I G. 17A
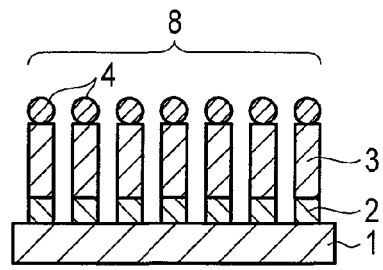
F I G. 17E
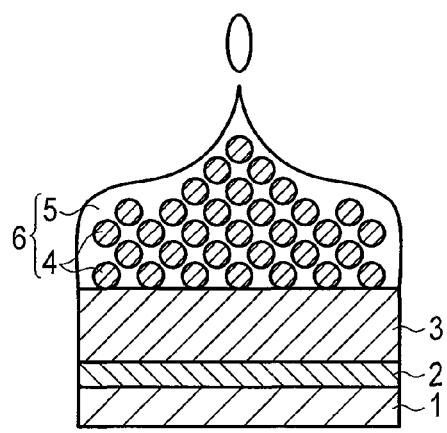
F I G. 17B
F I G. 17F
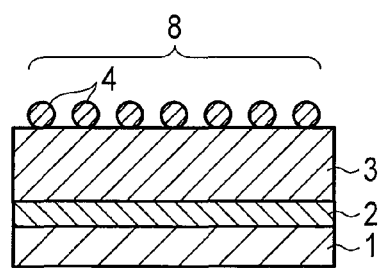
F I G. 17C
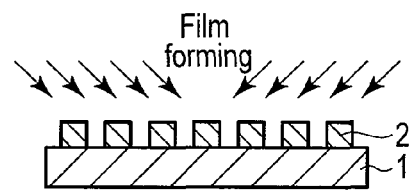
F I G. 17G
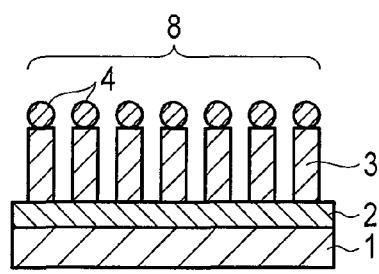
F I G. 17D
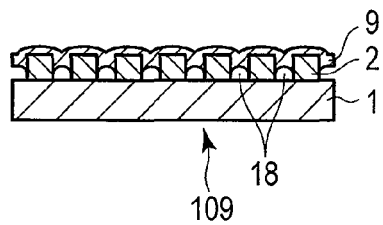
F I G. 17H

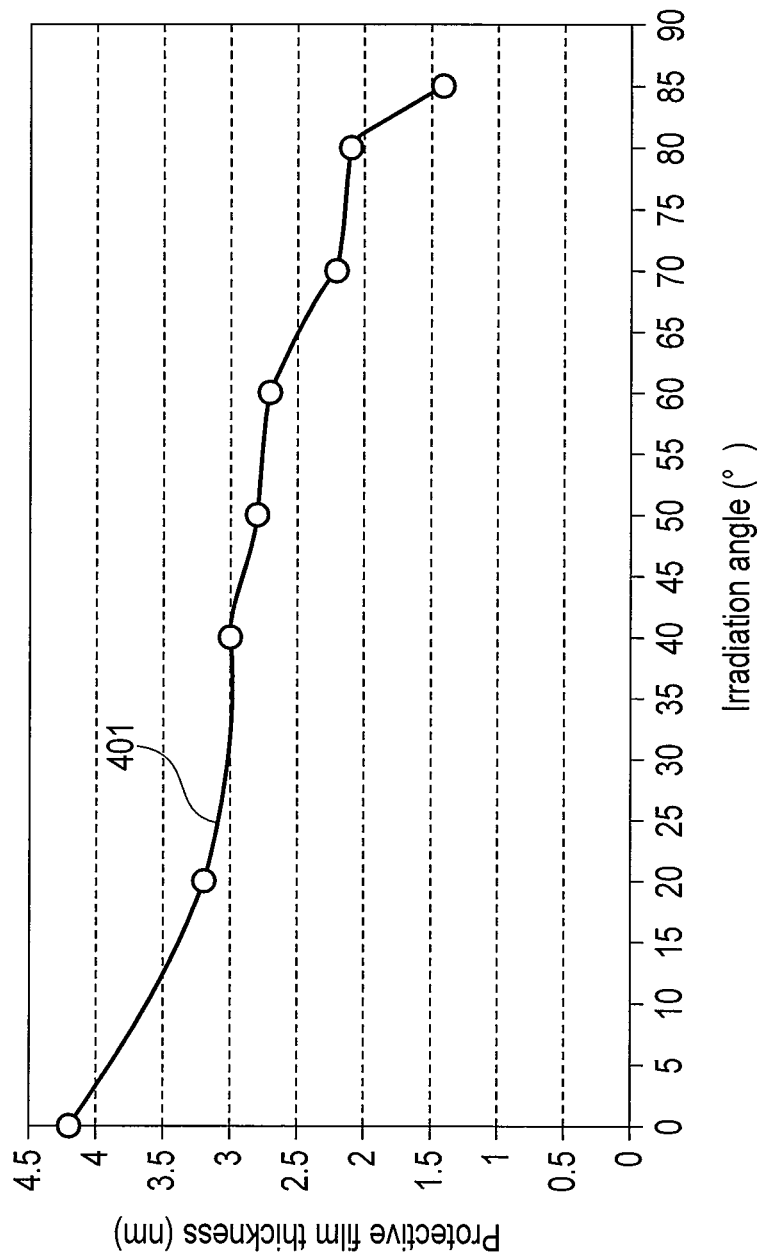
F I G. 21

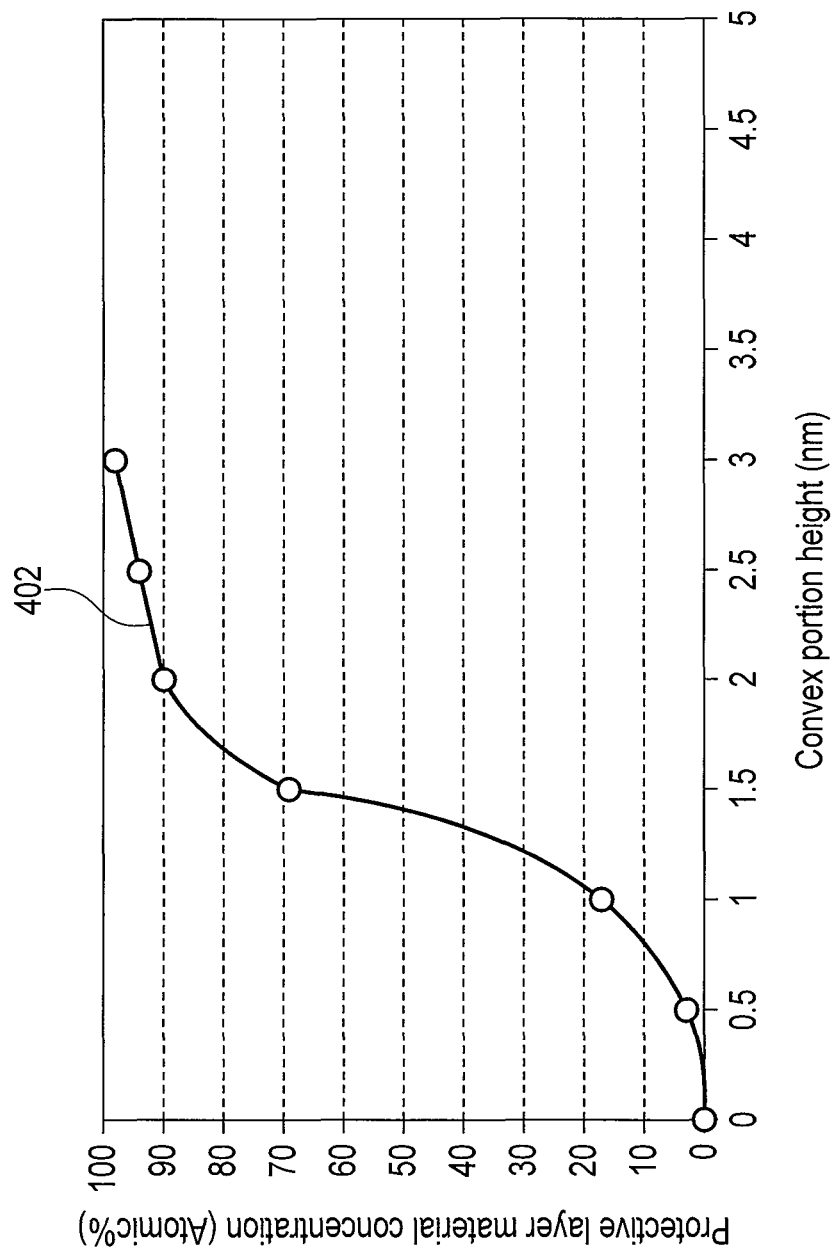
F I G. 22

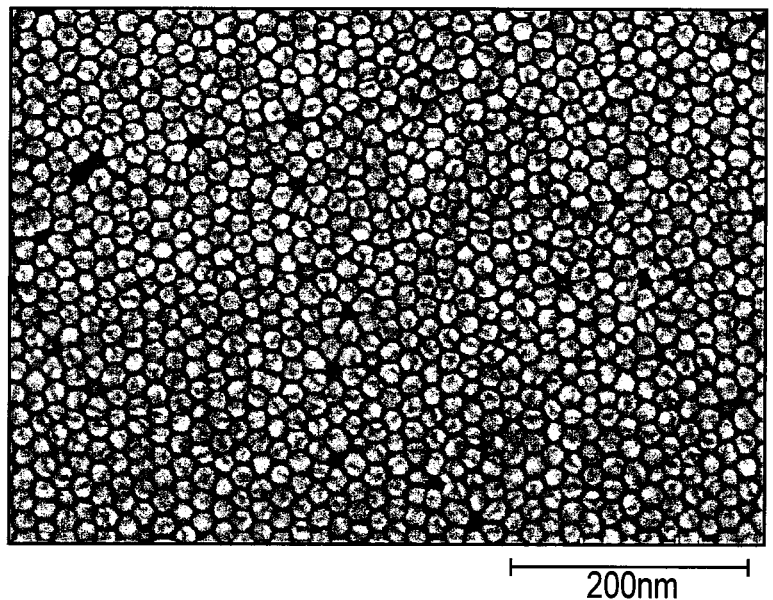
F I G. 23
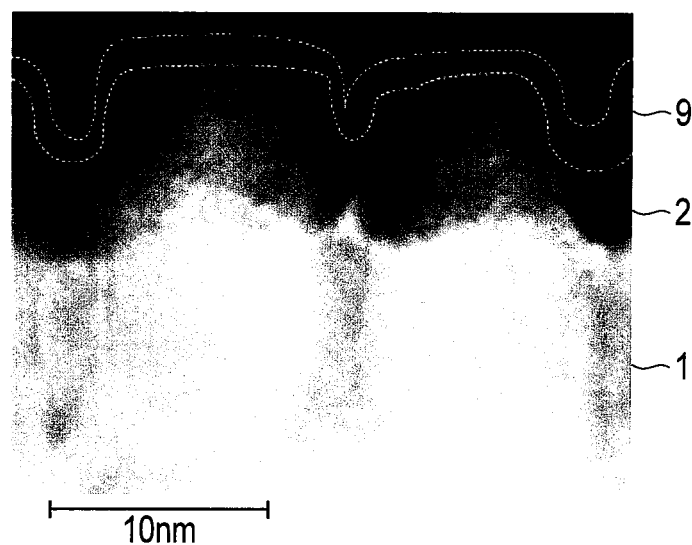
F I G. 24

MAGNETIC RECORDING MEDIUM AND METHOD FOR PRODUCING THE SAME

CROSS-REFERENCE TO RELATED APPLICATIONS

This application is based upon and claims the benefit of priority from Japanese Patent Application No. 2013-041233, filed Mar. 1, 2013, the entire contents of which are incorporated herein by reference.

FIELD

Embodiments described herein relate generally to a magnetic recording medium and a method for producing the same.

BACKGROUND

With a significant increase in the amount of information, there is an eager demand for the realization of a large volume information recording apparatus. In the hard disk drive (HDD) technology, a high recording density is achieved. Thus, various techniques concentrating on perpendicular magnetic recording have been developed. Further, a patterned medium is suggested as a medium which satisfies both the improvement in recording density and the thermal fluctuation resistance. The technique for manufacturing the medium has been actively developed.

The patterned medium records one or more magnetic areas as one cell. In order to record 1-bit information in one cell, it is possible that recording cells are magnetically separated. Therefore, a magnetic dot portion and a nonmagnetic portion may be formed on the same flat surface using a fine processing technology. There is a method for producing a fine concave-convex pattern is formed on a magnetic recording layer formed on a substrate using a semiconductor manufacturing technology. Then, the pattern is physically divided to obtain magnetically independent patterns.

In order to form a magnetic dot pattern, it suffices that a mask is previously formed on a magnetic film and the concave-convex pattern is transferred. Alternatively, there is a method for forming a concave-convex pattern on a mask material and injecting ions irradiated with high energy into a magnetic area so as to allow the pattern to be selectively deactivated, or a method for pressing a concave-convex mold against a resist material so as to transfer the concave-convex pattern.

In order to prevent the abrasion of the surface of the medium caused by magnetic head scanning and prevent the corrosion when being exposed to the outside environment, a protective film is usually formed on the magnetic film having a concave-convex pattern. The protective film needs to be formed into a thin film in order to narrow the magnetic spacing for receiving magnetic field signals from the magnetic recording layer with high efficiency. Also, it is necessary to ensure the thickness for preventing the corrosion.

In the case where the protective film is formed on the convexo-concave portion of the magnetic recording layer formed on the substrate, when the pattern pitch is sufficiently large, the protective film uniformly covers the upper and side surfaces of the pattern. Accordingly, it is possible to prevent the surface smoothness from being impaired. However, in a patterned medium aiming at high recording density, a distance between convexo-concave portions becomes significantly narrow. Thus, the protective film is not uniformly formed and the positional dependence of the roughness difference between the concave-convex portions becomes higher. Consequently, the flying stability of the magnetic head is deteriorated and it impossible to avoid a decrease in an S/N signal. Further, in the case of the coexistence of a data area where a pattern for identifying digital signals "1" and "0" is arranged and a servo area which has the responsibility of the positioning information of the head, the density (sparse or dense) of the pattern is high, and thus the protective film is not uniformly coated. Therefore, the coatability of the protective film in the concave-convex pattern with a narrow pitch is an important measure directly linked to the improvement in the flying stability of the head and the improvement in the S/N signal by the reduction in the magnetic spacing.

For example, in a technique comprising using a concave-convex pattern formed on a substrate as an underlayer and forming a magnetic film to produce a magnetic recording concave-convex pattern, the pattern having a protective film thereon has a big roughness difference between the concave-convex portions. Thus, the flying stability is deteriorated and there is a problem of a decrease in the S/N signal.

For example, in a technique comprising selectively etching a grain boundary portion of a magnetic recording layer formed on a substrate to produce a magnetic recording concave-convex pattern, it has been difficult to solve the same problem as that of Patent Literature 1.

BRIEF DESCRIPTION OF THE DRAWINGS

FIG. 1 is a cross-sectional view schematically showing the configuration of a magnetic recording medium according to one embodiment;

FIGS. 2A and 2B are pattern diagrams showing an example of a periodic pattern in the magnetic recording layer to be used in the embodiment;

FIGS. 3A and 3B are pattern diagrams showing an example of a periodic pattern in the magnetic recording layer to be used in the embodiment;

FIGS. 4A and 4B are pattern diagrams showing an example of a periodic pattern in the magnetic recording layer to be used in the embodiment;

FIGS. 5A and 5B are pattern diagrams showing an example of a periodic pattern in the magnetic recording layer to be used in the embodiment;

FIGS. 6A, 6B and 6C are pattern diagrams showing a relationship in size between a magnetic layer and a protective layer;

FIGS. 9A, 9B, 9C, 9D, 9E, 9F and 9G are flow charts of a method for producing a magnetic recording medium according to a third embodiment;

FIGS. 12A, 12B, 12C, 12D, 12E, 12F, 12G and 12H are flow charts of a method for producing a magnetic recording medium according to a sixth embodiment;

FIGS. 13A, 13B, 13C, 13D and 13E are views showing a process of producing a nanoimprint stamper;

FIGS. 16A, 16B, 16C, 16D, 16E, 16F, 16G, 16H and 16I are views showing an example of a method for producing a magnetic recording medium by self-assembly lithography;

FIGS. 17A, 17B, 17C, 17D, 17E, 17F, 17G and 17H are views showing an example of a process of producing a magnetic recording medium using metal fine particles;

FIG. 21 is a graph showing a relationship between an irradiation angle of a film formation material at the time of obliquely forming a protective film and a film thickness of the formed protective film;

FIG. 22 is a graph showing a relationship between a height of a convex portion of a magnetic recording layer and a concentration of material in a protective layer;

FIG. 23 is an upper SEM photograph of the magnetic recording medium according the embodiment; and FIG. 24 is a cross sectional TEM photograph of the magnetic recording medium according the embodiment.

DETAILED DESCRIPTION

Figure 7A:
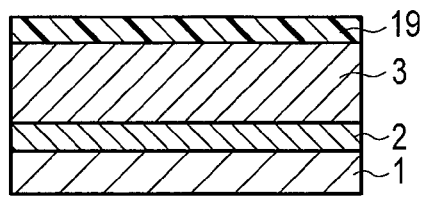
FIGS. 7A, 7B, 7C, 7D, 7E and 7F are flow charts of a method for producing a magnetic recording medium according to a first embodiment.

In general, according to one embodiment, a magnetic recording medium includes a substrate, a magnetic recording layer having convex-shaped magnetic layers which is formed on the substrate, a protective film formed on the magnetic recording layer, and further includes gaps in a region surrounded by the protective film, the surface of the substrate, and each side wall of each magnetic layer.

Further, according to one embodiment, a magnetic recording/reproducing device includes a magnetic recording medium which includes a substrate, a magnetic recording layer having convex-shaped magnetic layers which is formed on the substrate, and a protective film formed on the magnetic recording layer, and a read/write head; and further includes gaps in a region surrounded by the protective film, the surface of the substrate, and each side wall of each magnetic layer.

Further, according to one embodiment, the method for producing a magnetic recording medium includes:
forming a magnetic recording layer on a substrate;
patterning the magnetic recording layer to form a magnetic recording layer having convex-shaped magnetic layers; and
forming a protective film on the magnetic recording layer by oblique film formation of a protective film material on the convex pattern of the magnetic recording layer and providing gaps in a region surrounded by the protective film, the surface of the substrate, and each side wall of each magnetic layer.

According to one embodiment, there is provided gaps in a region surrounded by the protective film, the surface of the substrate, and each side wall of each magnetic layer so that the protective film bonds a portion between the convex-shaped magnetic layers, and the hollow of the protective film formed between the magnetic layers is reduced. Thus, the in-plane uniformity on the surface of the medium is excellent. As a result, the flying stability at the time of head operation is improved. Since a small amount of air currents are generated at the concave portion, the head is hardly dropped. Thus, the frequency of head crash can be significantly reduced. Further, an excellent S/N signal value is obtained by the flying stability and reduction in magnetic spacing.

Here, the term "oblique film formation" means a process of forming a film by irradiating the surface of a substrate material on which a film formation material is formed with the light from an oblique direction. As the film formation technique, for example, vacuum deposition, sputtering, ion-beam-deposition or the like can be used.

Hereinafter, embodiments will be described with reference to the drawings.

FIG. 1 shows a cross-sectional view schematically showing the configuration of a magnetic recording medium according to one embodiment.

As shown in FIG. 1, a magnetic recording medium 100 according to one embodiment is a magnetic recording medium including a magnetic recording layer 2 having a plurality of convex-shaped magnetic layers 26 having a periodic pattern formed on a substrate 1. The magnetic recording medium includes a magnetic recording layer 2 having magnetism formed on a continuous non-magnetic layer formed on the substrate 1 (not shown), is configured to include the magnetic recording layer 2 formed by convex pattern and a non-magnetic region of the concave pattern, and includes gaps 18 formed in a region surrounded by the magnetic recording layer 2 formed by convex pattern, adjacent convex patterns, a protective film 9 formed on the upper portion of the patterns.

Here, the pattern of the convex-shaped magnetic layers 26 which forms the magnetic recording layer 2 is periodic in a plane of the substrate 1. The pattern pitch can be set to 20 nm or less. If the pitch exceeds 20 nm, the upper and side surfaces of the convex-shaped magnetic recording layers are uniformly covered with the protective film. The roughness difference between the concave-convex portions is increased, which leads to a tendency to deteriorate the flying characteristics.

Practically, the pattern pitch can be set to 2 nm or more. If it is less than 2 nm, the separability of the pattern is deteriorated, which leads to a tendency to deteriorate the transfer properties of the concave-convex pattern.

FIGS. 2A to 5B show pattern diagrams showing examples of periodic patterns of the magnetic recording layers of the magnetic recording media according to the embodiments.

Upper shapes of the periodic patterns have various structures such as a circular shape 301 as shown in FIG. 2A, an oval shape 303 as shown in FIG. 3A, a square shape 305 as shown in FIG. 4A (a rectangular shape), and a polygonal shape 307 as shown in FIG. 5A. They are mixed on the substrate not depending on the kinds and numbers of these structures. Their cubic shapes have structures such as a cylindrical shape 304 as shown in FIG. 2B, a conical shape 306 as shown in FIG. 3B, a prismatic shape 308 (pyramidal shape) as shown in FIG. 4B, and a polygonal column shape 309 as shown in FIG. 5B. That is, the taper angle on the surface of the substrate can be taken freely.

The term "pitch of the periodic pattern" means a distance between the center of the pattern of the convex-shaped magnetic layer and the center of the adjacent convex patterns, i.e., a state where the pitch is continued twice or more. The periodic pattern can be uniformly arranged in a plane. Even if the pitch is not periodic due to the pattern defects and is discontinued with a discontinuous value at a certain portion, the pitch should to be periodic again.

The thickness of the protective film may have a value lower than a height of the convex pattern of the magnetic recording layer. The protective film concentration distribution in the side wall portion of the magnetic recording layer at the convex portion may have a skewed shape. The protective film concentration distribution may be high at the medium surface side, while it may be low at the substrate side. The protective film concentration is a concentration of a major element in the protective film material on the side surface of the material forming the magnetic recording layer. Here, the term "major element" means an element which is contained in an amount of 50% by atomic weight or more among various elements comprising the protective film material. In other words, this shows that, on the side surface in which the convex-shaped magnetic recording layer is exposed, the main component of the protective film material is largely adhered to the surface of the substrate.

The material of the protective film is selected from various materials. For example, metals, nonmetals, alloys, oxides, and nitrides as well as compounds of these substances can be used.

Further, the thickness of the protective film material is the largest on the convex-shaped magnetic recording layer, while it is the smallest between convex-convex portions.

The concave pattern portion surrounded by the convex-shaped magnetic recording layer and the protective film material is a gap region where the magnetic recording layer material and the protective film material are not present. The gap region can be comprised of air, vacuum, and inert gas atmospheres.

A protective film is arranged on the upper portion of the gap region and a portion between the convex-convex patterns is bridge-bonded. Therefore, since the concave pattern is not exposed to the surface of the substrate, the air eddy is not generated when the head is flying, and the drop of the head to the substrate is suppressed. Thus, the flying stability during head scanning is improved.

FIGS. 6A to 6C show pattern diagrams showing a relationship in size between the magnetic layer and the protective layer.

FIG. 6A shows a view of the arrangement of the magnetic layer and the protective layer when viewed from the upper direction of the magnetic recording medium.

FIG. 6B shows an X-X' cross-sectional view of FIG. 6A.

FIG. 6C shows a Y-Y' cross-sectional view of FIG. 6A.

As shown in FIGS. 6B and 6C, the protective layer 9 has a different thickness depending on the position of the periodic pattern. Specifically, when, in the distance X-X' where the patterns are most close to each other, the thickness of the protective layer 9 at the upper portion of the dot is t1 and the thickness of the protective layer 9 between the dots of the magnetic layers 26 is t2, in the distance Y-Y' where the patterns are most distant from each other, the thickness of the protective layer 9 between the dots is t3, the condition is $t1 \leq t2 \leq t3$.

According to a magnetic recording medium according to one embodiment, there is provided a magnetic recording medium which can reduce the positional dependence of the roughness difference between the concave-convex portions on the surface of the medium, is excellent in in-plane uniformity, is excellent in flying characteristics (glide characteristics) of a magnetic head, and has an excellent S/N signal by reduction in magnetic spacing. The magnetic recording medium can decrease an amount of air currents at the concave portion, significantly reduce the frequency of head crash due to the drop of the head, and improve S/N signal by the flying stability.

The method for producing a magnetic recording medium according to the embodiment can be divided into, for example, seven embodiments as below.

FIGS. 7A to 7E show the flow chart of the method for producing a magnetic recording medium according to the first embodiment.

Figure 7D:
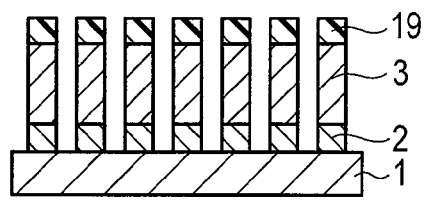
Figure 7B:
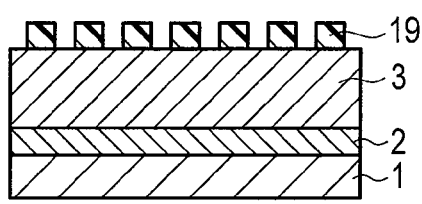
Figure 7E:
Figure 7C:
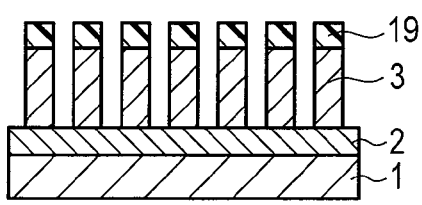
Figure 7F:
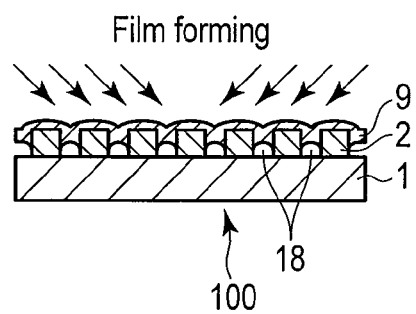

The first embodiment includes forming a magnetic recording layer 2 on a substrate 1, forming a mask layer 3 on the magnetic recording layer 2, and forming a resist layer 19 on the mask layer 3 as shown in FIG. 7A; patterning the resist layer 19 to form a convex pattern as shown in FIG. 7B; transferring the convex pattern to the mask layer 3 as shown in FIG. 7C; transferring from the mask layer 3 to the magnetic recording layer 2 and removing the mask layer 3 from the top of the magnetic recording layer 2 as shown in FIG. 7D; and obliquely forming a film of the protective film material on the convex pattern of the magnetic recording layer 2 and forming a protective film 9 on the magnetic recording layer 2 to form a magnetic recording medium 101 as shown in FIG. 7E. The magnetic recording medium 101 thus obtained includes the protective film 9 formed on the magnetic recording layer 2 and gaps 18 in a region surrounded by the protective film 9, the surface of the substrate 1, and each side wall of each magnetic layer of the magnetic recording layer 2.

FIGS. 8A to 8F show a flow chart of a method for producing a magnetic recording medium according to a second embodiment.

Figure 8A:
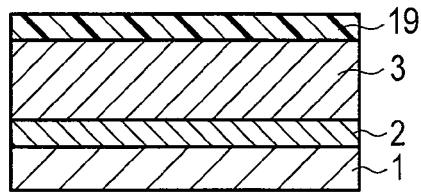
FIGS. 8A, 8B, 8C, 8D, 8E, 8F and 8G are flow charts of a method for producing a magnetic recording medium according to a second embodiment.
Figure 8B:
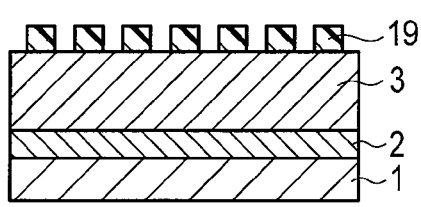
Figure 8C:
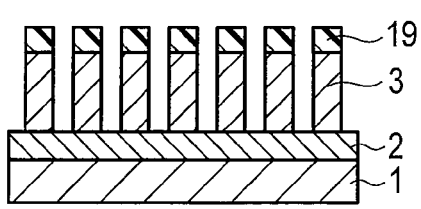
Figure 8D:
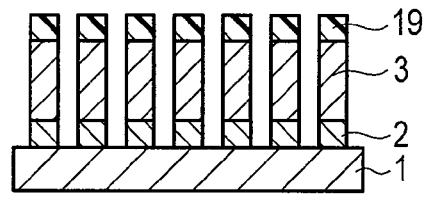
Figure 8E:
Figure 8F:
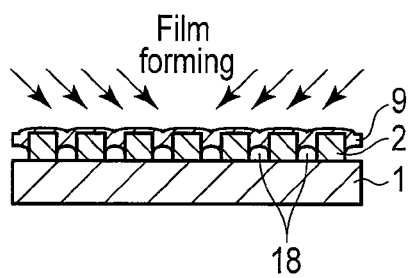
Figure 8G:
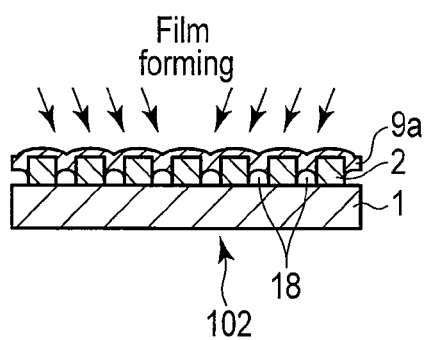

The second embodiment is a modification of the first embodiment. Here, a magnetic recording medium 102 having the same configuration of that of the magnetic recording medium 101 can be produced similarly to the first embodiment except that, as shown in FIG. 8F, the angle for the oblique film formation of a protective film material is changed to an angle different from that of FIG. 8E to appropriately set the angle for the oblique film formation multiple times and the protective film is further deposited on the protective film 9 formed in FIG. 8E to form a protective film 9'.

FIGS. 9A to 9F show the flow chart of the method for producing a magnetic recording medium according the third embodiment.

FIGS. 9A to 9F are the same as FIGS. 7A to 7E except that FIGS. 9E and 9F are used in place of FIG. 7E.

In the third embodiment, a magnetic recording medium 103 having the same configuration as that of the magnetic recording medium 101 can be produced similarly to the first embodiment except that, as shown in FIGS. 9E and 9F, a protective film 9b having a thickness thicker than that of a protective film 9 of FIG. 7E is formed by subjecting a protective film material to oblique film formation, and then the film thickness is reduced by etching.

FIGS. 10A to 10G show the flow chart of the method for producing a magnetic recording medium according the fourth embodiment.

Figure 10A:
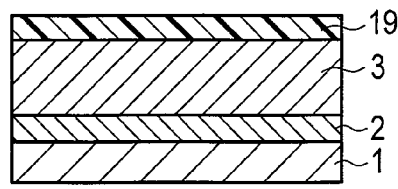
FIGS. 10A, 10B, 10C, 10D, 10E, 10F, 10G and 10H are flow charts of a method for producing a magnetic recording medium according to a fourth embodiment.
Figure 10E:
Figure 10B:
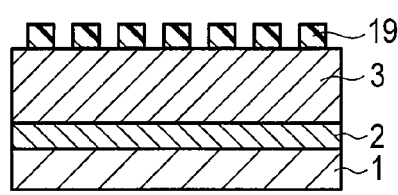
Figure 10F:
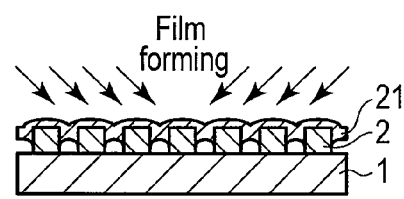
Figure 10C:
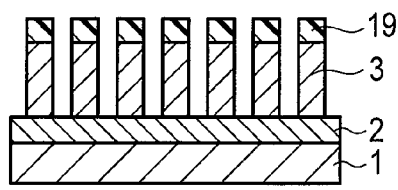
Figure 10G:
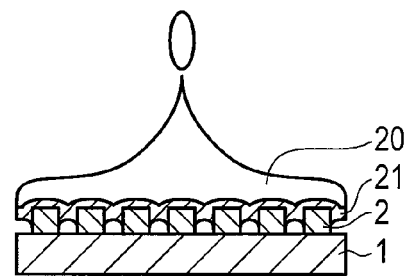
Figure 10D:
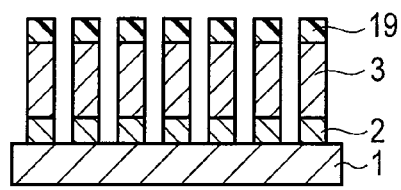
Figure 10H:
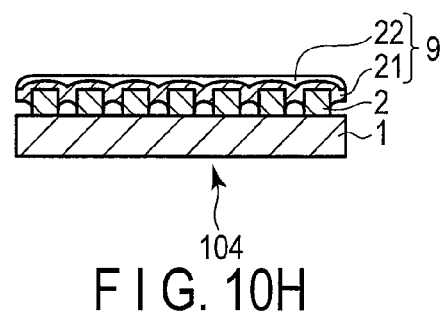

FIGS. 10A to 10G have the same processes as those of FIG. 7A to FIG. 7E except that FIG. 10F and FIG. 10G are further included.

In the fourth embodiment, a magnetic recording medium 104 having the same configuration as that of the magnetic recording medium 101 can be formed similarly to the first embodiment except that a first protective film 21 is formed by oblique film formation using a protective film material as shown in FIG. 10E, a coating liquid 20 containing the protective film material is applied as shown in FIG. 10F, and a second protective film 22 is further laminated on the first protective film 21 formed by oblique film formation to form a protective film 9.

FIGS. 11A to 11H show the flow chart of the method for producing a magnetic recording medium according the fifth embodiment.

Figure 11A:
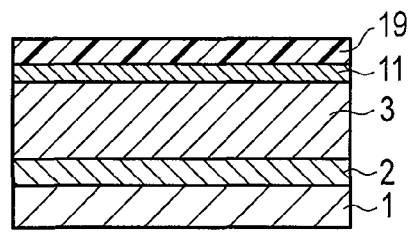
FIGS. 11A, 11B, 11C, 11D, 11E, 11F, 11G and 11H are flow charts of a method for producing a magnetic recording medium according to a fifth embodiment.
Figure 11E:
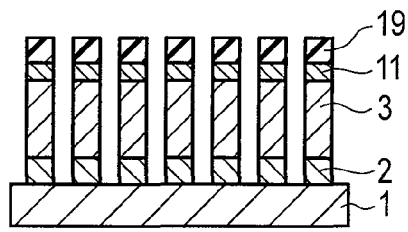
Figure 11B:
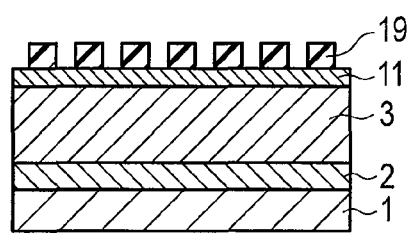
Figure 11F:
Figure 11C:
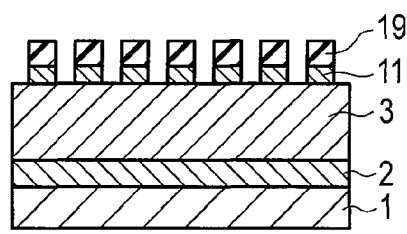
Figure 11G:
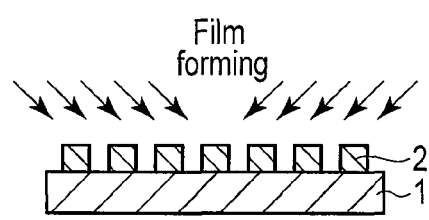
Figure 11D:
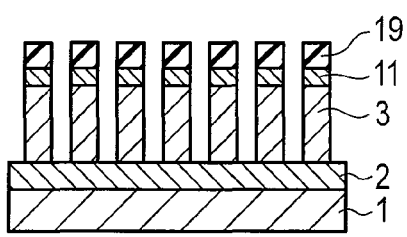
Figure 11H:
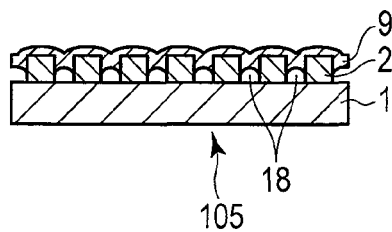

According to the fifth embodiment, a magnetic recording medium 105 can be produced similarly to the first embodiment except that a process of forming a transfer layer 11 between a mask layer 3 and a resist layer 19 is further included as shown in FIG. 11A, and a process of transferring a convex pattern to the transfer layer 11 is included before a process of transferring the convex pattern to the mask layer as shown in FIG. 11C. FIG. 11B shows a process of patterning a resist layer to forming a convex pattern. FIG. 11D shows a process of transferring a convex pattern to a mask layer. FIG. 11E shows a process of transferring a convex pattern to a magnetic recording layer. FIG. 11F shows a process of removing a mask layer to form a magnetic recording layer 2 having a plurality of convex-shaped magnetic layers. FIG. 11G shows a process of applying a protective film material in an oblique direction in oblique film formation. After passing through these processes, as shown in FIG. 11H, a magnetic recording medium 105 having the same configuration as that of the magnetic recording medium 101 can be formed.

FIGS. 12A to 12H show the flow chart of the method for producing a magnetic recording medium according the sixth embodiment.

In the sixth embodiment, as shown in FIG. 12A, a magnetic recording medium 106 can be produced similarly to the first embodiment except that a process of further forming a release layer 12 between a magnetic recording layer 2 and a mask layer 3 is included and further a process of transferring a convex pattern to the release layer 12 is included before a process of transferring a convex pattern to the magnetic recording layer 2 as shown in FIG. 12D. FIG. 12B shows a process of patterning a resist layer to forming a convex pattern. FIG. 12C shows a process of transferring a convex pattern to a mask layer. FIG. 12E shows a process of transferring a convex pattern to a magnetic recording layer. FIG. 12F shows a process of removing a release layer to form a magnetic recording layer 2 having a plurality of convex-shaped magnetic layers. FIG. 12G shows a process of applying a protective film material in an oblique direction in oblique film formation. After passing through these processes, as shown in FIG. 12H, a magnetic recording medium 106 having the same configuration as that of the magnetic recording medium 101 can be formed.

In the seventh embodiment, as shown in FIGS. 13 to 15, a magnetic recording medium can be produced by using a convex as a template to form a nanoimprint stamper, forming a convex pattern on a resist layer using the nanoimprint stamper, and transferring the convex pattern to a mask layer.

FIG. 13 shows the process of producing a nanoimprint stamper.

First, as shown in FIG. 13A, the resist layer 19 is formed on a substrate 1.

Next, as shown in FIG. 13B, the resist layer 19 is patterned to form a resist layer 19 having a convex pattern.

Subsequently, as shown in FIG. 13C, a conductive film 13 is formed on the convex-shaped resist layer 19. In the electroforming process as described below, if poor electric conduction is caused, the plating growth is inhibited, thereby leading to pattern defects. Accordingly, the conductive film 13 can be uniformly formed on the surface of the convex pattern and the side surface. However, when a conductive material is used for the metal fine particles and the substrate, it is not limited thereto. The convex pattern can have electrical continuity. In this case, the conductive film 13 may be formed on the top portion and side surface of a metal fine particle and gaps between the particles.

The conductive film 13 may be selected from various materials. Examples of the materials of the conductive film 13 include Ni, Al, Ti, C, Au, Ag, Cr, and Cu. Here, examples using Ni will be explained.

Subsequently, as shown in FIG. 13D, the master disc is immersed in a sulfamic-acid Ni or NiP bath and energized, followed by electroforming to form an electroformed layer 14 as a stamper on the conductive film 13. The film thickness after plating, i.e., the thickness of the stamper can be adjusted by changing the energizing current value and the plating time, in addition to the hydrogen ion concentration, temperature, and viscosity of the plating bath. The electroforming process can be performed by electrolytic plating or non-electrolytic plating.

A stamper 201 thus obtained is released from the substrate 1 as shown in FIG. 13E. Finally, unnecessary portions other than the surface of the convex pattern are mechanically removed, and the stamper is further processed into a desired shape such as a circular or rectangular shape, resulting in completion of the stamper.

FIGS. 14A to 14I are views showing a modification of the process of producing a nanoimprint stamper.

Figure 14A:
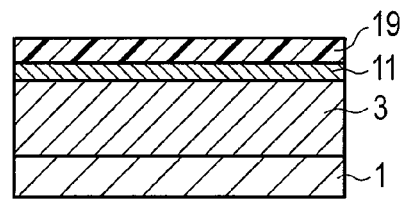
FIGS. 14A, 14B, 14C, 14D, 14E, 14F, 14G, 14H and 14I are views showing a modification of the process of producing a nanoimprint stamper.

As shown in FIG. 14A, the mask layer 3, the transfer layer 11, and the resist layer 19 are formed on the substrate 1.

Figure 14E:
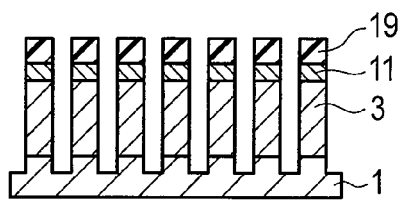
Figure 14B:
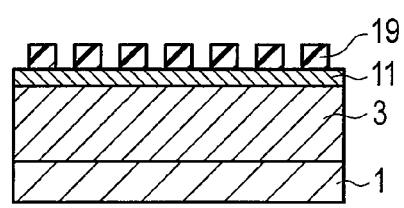

Next, as shown in FIG. 14B, the resist layer 19 is patterned to form the resist layer 19 having a convex pattern.

Figure 14F:
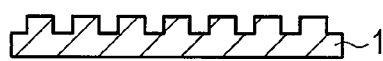
Figure 14C:
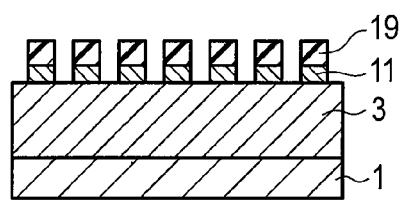

Subsequently, as shown in FIG. 14C, the convex pattern is transferred to the transfer layer 11.

Figure 14G:
Figure 14H:
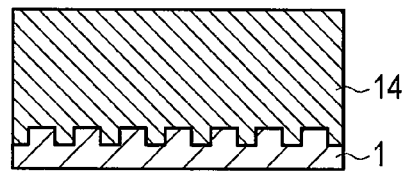
Figure 14D:
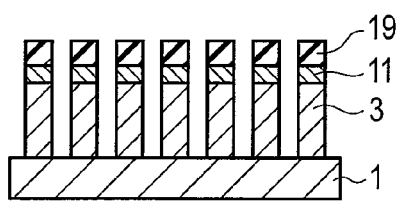

Thereafter, as shown in FIG. 14D, the convex pattern is transferred to the mask layer 3.

Further, as shown in FIG. 14E, the convex pattern is transferred to the substrate 1.

Subsequently, as shown in FIG. 14F, the mask layer is peeled off to obtain the substrate 1 having the convex pattern formed thereon.

Subsequently, as shown in FIG. 14G, the conductive film 13 is formed on the substrate 1.

Subsequently, as shown in FIG. 14H, the master disc is immersed in a sulfamic-acid Ni or NiP bath and energized, followed by electroforming to form an electroformed layer 14 as a stamper on the conductive film 13.

Figure 14I:
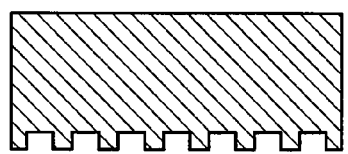

A stamper 202 thus obtained is released from the substrate 1 as shown in FIG. 14I.

After the process of FIG. 14G, the convex pattern is transferred to the substrate 1 through the mask layer 3. A master disc having a substrate (not shown) to which the convex pattern is transferred is used to produce a stamper.

The stamper is used as an alternative to the master disc so that a duplicated stamper can be produced. In this case, examples of the production method include a method for producing an Ni stamper from an Ni stamper, a method for producing a resin stamper from an Ni stamper or the like.

FIGS. 15A to 15J show views for explaining another example of the method for producing a magnetic recording medium according to the first embodiment.

Figure 15A:
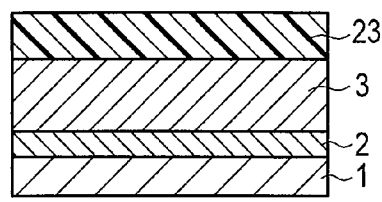
FIGS. 15A, 15B, 15C, 15D, 15E, 15F, 15G, 15H, 15I and 15J are views for explaining another example of the method for producing a magnetic recording medium according to the first embodiment.
Figure 15F:
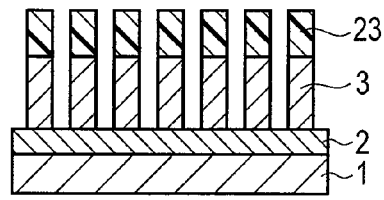
Figure 15B:
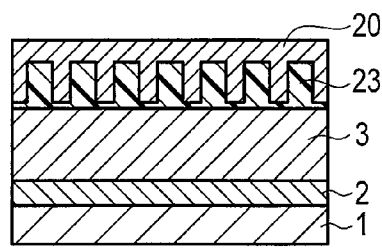
Figure 15G:
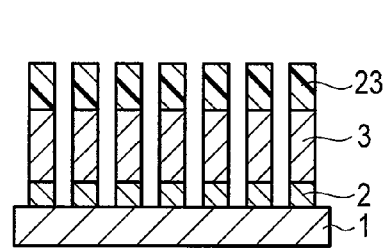

As shown in FIG. 15A, these resist materials are applied to the sample having the magnetic recording layer 2 and the mask layer 3 on the substrate 1 to form a resist layer 15. Subsequently, as shown in FIG. 15B, a resin stamper 202 having a convex pattern is imprinted on the resist layer 15. If the resin stamper 202 is pressed against the resist in the imprinting process, the resist is fluidized to form a convex pattern. Here, if energies such as ultraviolet rays are applied to the resist layer 15 to cure the resist layer 15 having the convex pattern thereon and then the resin stamper 202 is released, the convex pattern of the resist layer 15 is obtained. In order to easily release the resin stamper 202, the surface of the resin stamper 202 may be subjected to a releasing treatment using a silane coupling agent.

Figure 15C:
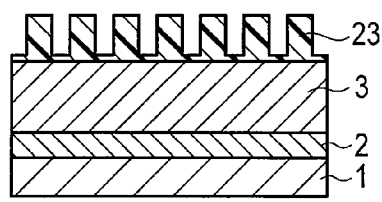
Figure 15H:
Figure 15D:
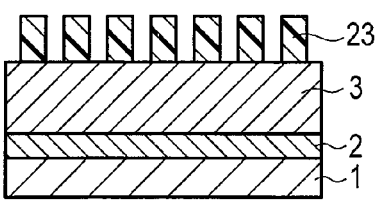

Subsequently, as shown in FIG. 15C, the resin stamper 202 to which an imprint resist is pressed is released. After the release of the resin stamper 202, the resist material remains as a residue in a recess portion of the resist layer 15. Thus, as shown in FIG. 15D, the surface of the mask layer 3 is exposed by removing the material by etching. Since the polymer-based resist material has generally low etching resistance to the $O_2$ etchant, the residue can be easily removed by dry etching using an $O_2$ gas. When an inorganic material is included, the etching gas can be appropriately changed so as to allow the resist pattern to remain. As shown in FIGS. 15D, 15F, 15G, and 15H, the convex pattern is transferred to the mask layer 3 and the magnetic recording layer 2.

Figure 15I:
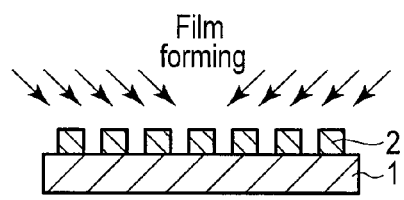
Figure 15E:
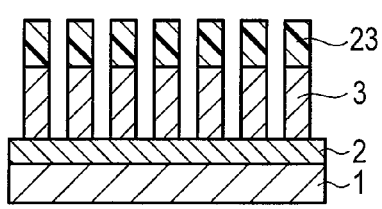
Figure 15J:
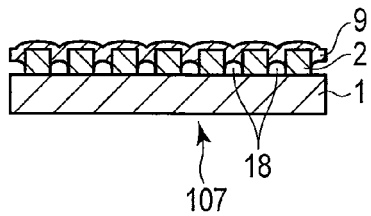

Thereafter, as shown in FIG. 15I, the protective film material is obliquely formed into a film on the convex pattern of the magnetic recording layer 2 and the protective film 9 is formed on the magnetic recording layer 2 to form a magnetic recording medium 107 as shown in FIG. 15J. The magnetic recording medium 107 thus obtained includes the protective film 9 formed on the magnetic recording layer 2 and gaps 18 in a region surrounded by the protective film 9, the surface of the substrate 1, and each side wall of each magnetic layer of the magnetic recording layer 2.

Thus, the magnetic recording medium 107 having a convex pattern can be produced by nanoimprint lithography.

In the first to seventh embodiments, the method for forming a convex pattern on a resist layer includes, for example, a lithography method using energy beams as shown in FIGS. 16 to 18, a nanoimprint method, and a patterning method using a mask formed by using a self-assembled film comprised of a block copolymer having at least two or more polymer chains or metal fine particles as a mask. When a self-assembled film is used, a convex pattern can be transferred by forming a microphase-separated structure in a film, selectively removing one kind of polymer phases, and using the remained polymer phase as a mask. When a metal fine particle mask is used, a convex pattern can be transferred by using metal fine particles arranged on the same flat surface as a separate mask layer. Further, the above convex pattern is used as a convex template and a nanoimprint stamper is produced from the template. Then, the convex pattern may be transferred using the stamper.

FIGS. 16A to 16I show views for explaining an example of the method for producing a magnetic recording medium by self-assembly lithography.

First, as shown in FIG. 16A, a magnetic recording medium in which the magnetic recording layer 2 and the mask layer 3 are formed on the substrate 1 is prepared.

When the self-assembled film is used, as shown in FIG. 7A, the magnetic recording layer 2, the mask layer 3, and the resist layer 19 are formed on the substrate 1. Instead of transferring the convex pattern by photolithography as shown in FIG. 1B, a self-assembled layer 24 which is comprised of a block copolymer having two or more polymer chains shown in FIG. 16B is formed on the mask layer 3 shown in FIG. 16A. Microphase-separated structures 25 and 26 are formed on the self-assembled layer 24 by thermal annealing as shown in FIG. 16C. Thereafter, as shown in FIG. 16D, one kind of polymer phases 25 is selectively removed and remaining polymers 26 are used as a mask to transfer the convex pattern. Subsequently, the process includes transferring the convex pattern to the mask layer 3 as shown in FIG. 16E, transferring the convex pattern to the magnetic recording layer 2 as shown in FIG. 16F, and peeling the mask layer 3 to obtain a pattern processed magnetic recording medium as shown in FIG. 16G.

Further, as shown in FIG. 16H, the protective film material is obliquely formed into a film on the convex pattern of the magnetic recording layer 2 and the protective film 9 is formed on the magnetic recording layer 2 to form a magnetic recording medium 108 as shown in FIG. 16I. The magnetic recording medium 108 thus obtained includes the protective film 9 formed on the magnetic recording layer 2 and gaps 18 in a region surrounded by the protective film 9, the surface of the substrate 1, and each side wall of each magnetic layer of the magnetic recording layer 2.

FIGS. 17A to 17H are views showing an example of the production process of the magnetic recording medium using metal fine particles.

First, as shown in FIG. 17A, the mask layer 3 is formed on the magnetic recording medium 2 formed on the substrate 1.

Next, as shown in FIG. 17B, a metal fine particle coating liquid 6 containing metal fine particles 4 and a first solvent 5 is dropped and applied onto the mask layer 3. As shown in FIG. 17C, a metal fine particle film 8 having metal fine particles 4 arranged on the mask layer 3 is obtained.

Then, as shown in FIG. 17D, a convex pattern formed of a metal fine particle film 8 is transferred to the mask layer 3.

Next, as shown in FIG. 17E, the convex pattern is transferred to the magnetic recording layer 2 through the metal fine particle film 8 and the patterned mask layer 3.

Further, as shown in FIG. 17F, the substrate 1 and the patterned magnetic recording layer 2 formed thereon are obtained by removing the mask layer 3 on the magnetic recording layer 2 and the single layer of the metal fine particle film 8.

Thereafter, as shown in FIG. 17G, the protective film material is obliquely formed into a film on the convex pattern of the magnetic recording layer 2 and the protective film 9 is formed on the magnetic recording layer 2 to form a magnetic recording medium 109 as shown in FIG. 15J. The magnetic recording medium 109 thus obtained includes the protective film 9 formed on the magnetic recording layer 2 and gaps 18 in a region surrounded by the protective film 9, the surface of the substrate 1, and each side wall of each magnetic layer of the magnetic recording layer 2.

FIGS. 18A to 18K are views showing another example of the production process of the magnetic recording medium using metal fine particles.

First, a magnetic recording medium having a magnetic recording layer on a substrate is prepared.

Figure 18A:
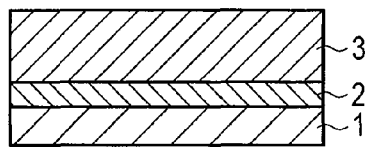
FIGS. 18A, 18B, 18C, 18D, 18E, 18F, 18G, 18H, 18I, 18J and 18K are views showing another example of the process of producing a magnetic recording medium using metal fine particles.

First, as shown in FIG. 18A, the mask layer 3 is formed on the magnetic recording medium 2 formed on the substrate 1.

Figure 18B:
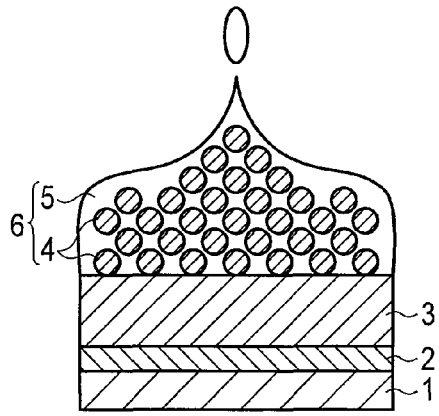
Figure 18C:
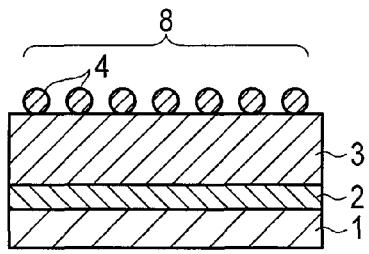

Then, as shown in FIG. 18B, a metallic fine particle coating liquid 6 which includes metallic fine particles 4 coated with protective layers (not shown) and a solvent 5 is dropped and applied onto a mask layer 3 to obtain a metallic fine particle film 8 having metallic fine particles regularly arranged as shown in FIG. 18C.

Figure 18D:
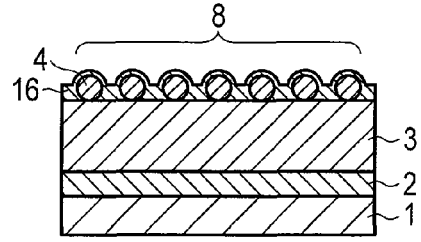

Subsequently, as shown in FIG. 18D, an overcoat layer 16 which covers the surface of the metallic fine particle film 8 and the surface of the mask layer 3 having the metallic fine particle film 8 formed thereon is formed.

Figure 18E:
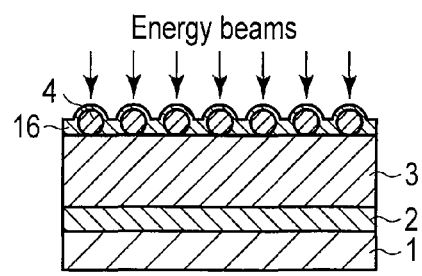

Thereafter, as shown in FIG. 18E, the protective layers on the surfaces of the metallic fine particles 4 are deactivated by irradiating the metallic fine particle film 8 with energy beams through the overcoat layer 16.

Figure 18F:
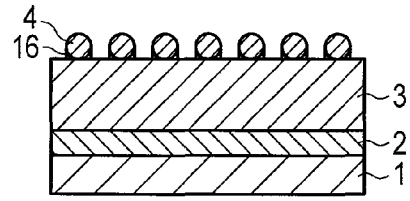

As shown in FIG. 18F, the convex pattern of the metal fine particle film 8 is formed on the surface of the mask layer 3 by etching the overcoat layer 16 using the metal fine particle layer 8 as a mask.

Figure 18G:
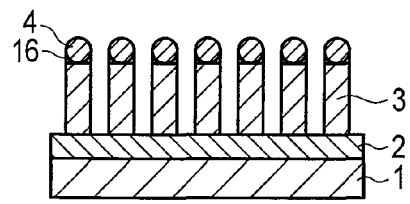

Then, as shown in FIG. 18G, the convex pattern formed of a single layer of the metallic fine particle film 8 is transferred to the mask layer 3.

Figure 18H:
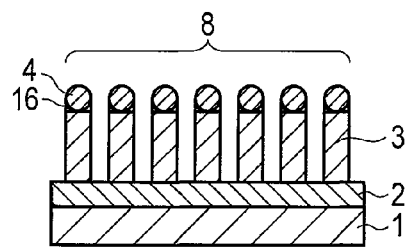

Subsequently, as shown in FIG. 18H, the convex pattern is transferred to a magnetic recording layer 2 through a single layer of the metal fine particle film 8 and the patterned mask layer 3.

Figure 18I:
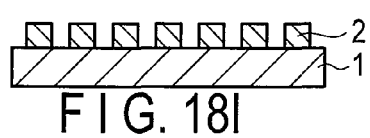

Further, as shown in FIG. 18I, the substrate 1 and the patterned magnetic recording layer 2 formed thereon are obtained by removing the mask layer 3 on the magnetic recording layer 2 and the single layer of the metal fine particle film 8.

Figure 18J:
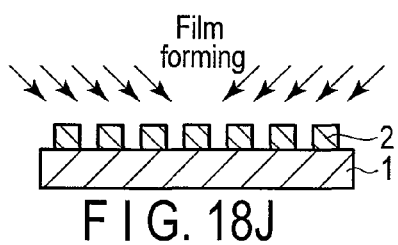
Figure 18K:
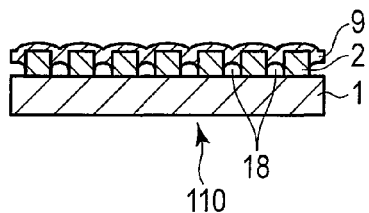

As shown in FIG. 18J, the protective film material is obliquely formed into a film on the convex pattern of the magnetic recording layer 2 and the protective film 9 is formed on the magnetic recording layer 2 to form a magnetic recording medium 110 as shown in FIG. 18K. The magnetic recording medium 110 thus obtained includes the protective film 9 formed on the magnetic recording layer 2 and gaps 18 in a region surrounded by the protective film 9, the surface of the substrate 1, and each side wall of each magnetic layer of the magnetic recording layer 2.

In forming the protective film, the protective film material is irradiated with the light from an oblique direction to the surface of the substrate to form the protective film on the magnetic recording layer. At this time, the angle when subjecting the protective film material to the oblique film formation may be appropriately changed during the formation of the protective film. The protective film can be formed by setting a plurality of the irradiation angles.

Here, the term "irradiation angle" means an angle measured when perpendicular and horizontal directions to the surface of the substrate are 0° and 90°, respectively. Hence, the angle in the case where the surface of the substrate faces the protective layer material is 0°, and the angle in the case where the surface of the convexo-concave side of the substrate faces the protective layer material is 90°.

In the case of the oblique film formation of the protective film material, there are methods such as a method for arranging a sample jig so as to be inclined to a fixed protective film material source, a method for inclining and arranging a sample substrate loaded in a jig, and a method for inclining and arranging a protective film material source to a fixed substrate material.

The protective film material can be selected from various materials, and a non-magnetic material can be used. For example, it can be selected from Al, Si, Ti, V, Cr, Mn, Cu, Zn, Ge, Y, Zr, Mo, Pd, Ag, xHf, W, Pt, and Au.

The thickness of the protective film material can be 5 nm or less in order to achieve the improvement of the S/N signal by reduction of magnetic spacing. In order to allow coatability on the convex pattern to be excellent, the thickness can be greater than 0.1 nm.

The gap region surrounded by the magnetic recording layer and the protective film may be substituted by an atmosphere during formation of the protective film. For example, when the protective film is formed in an inert gas atmosphere such as He, $N_2$ or Ar, the gap is filled with inert gas.

In the second embodiment, the irradiation angle for oblique film formation of a protective film material may be appropriately set to different angles such as $\theta 1, \theta 2, \theta 3, \ldots \theta n$ (n is an integer).

In the third embodiment, the protective film material is formed into a thick film by the oblique film formation and then the film thickness is reduced by wet or dry etching so that the surface roughness can be reduced. In combination with the second embodiment, the oblique film formation is performed at different irradiation angles and then the process of etching the protective film to reduce the thickness may be repeated.

In the fourth embodiment, the protective film material is formed into a film by oblique incidence and a solution containing the protective film material is applied to the surface of the protective film so that the surface roughness can be reduced. The coating of the protective film material can be performed by various methods. Usable examples thereof include methods such as spin-coating, dip-coating, spin-casting, Langmuir Blodgett technique, and ink-jetting.

In the fifth embodiment, the transfer layer to be formed on the mask layer is comprised of various materials. Further, methods such as wet etching and dry etching can be applied to the processing of the layer. The use of the transfer layer allows for an improvement in the transfer accuracy of the convex pattern.

In the sixth embodiment, the release layer to be formed on the magnetic recording layer may be comprised of various materials such as metals, alloys, compounds, and organic compounds. The convex pattern is transferred to the magnetic recording layer and then the release layer is dissolved so that the particles present in the mask layer and the upper layer can be removed from the surface of the medium. Thus, it is possible to clean up the surface of the medium and improve the surface properties.

In the seventh embodiment, an imprint stamper is produced from the convex pattern of the resist layer formed on the substrate, and the convex pattern is transferred to the magnetic recording layer by nanoimprint lithography using the imprint stamper. The use of nanoimprint allows the pattern to be batch-transferred to a large area of the substrate. Thus, the production throughput can be improved.

The first to seventh embodiments of the production method may be performed by combining with one another.

According to the method for producing a magnetic recording medium according to the embodiments, it is possible to produce a magnetic recording medium in which the roughness difference between the concave-convex portions on the magnetic recording medium is reduced, the flying characteristics of the head are excellent, and the S/N signal is excellent due to the reduction of magnetic spacing. Further, it is possible to simply form a protective film on the surface of the medium having good flying characteristics of the head. Thus, simplification of the production process is realized.

Process of Forming Magnetic Recording Layer

First, a magnetic recording layer is formed on a substrate to obtain a magnetic recording medium.

There is no restriction on the shape of the substrate. Usually, a round and hard substrate is used. For example, a glass substrate, a metal-containing substrate, a carbon substrate, a ceramic substrate or the like is used. In order to make the in-plane uniformity of the pattern excellent, it is possible to reduce the convex pattern on the surface of the substrate. If necessary, it is possible to form a protective film like an oxide film on the surface of the substrate.

Amorphous glass represented by soda lime glass and aluminosilicate glass or crystallized glass represented by lithium-based glass may be used for the glass substrate. A sintered substrate which contains alumina, aluminium nitride, and silicon nitride as main components may be used for the ceramic substrate.

A magnetic recording layer having a perpendicular magnetic recording layer which contains cobalt as a main component is formed on the substrate.

Here, it is possible to form a soft under layer (SUL) having high magnetic permeability between the substrate and the perpendicular magnetic recording layer. The soft under layer shares responsibility for the magnetic recording head function of circulating a record magnetic field from a magnetic recording head which magnetizes the perpendicular magnetic recording layer. The recording/reproduction efficiency can be improved by applying a steep sufficient perpendicular magnetic field to the recording layer in the magnetic field.

For example, materials including Fe, Ni, and Co may be used for the soft under layer. Among those materials, amorphous materials which have no magnetocrystalline anisotropy, crystal defects, and grain boundary and exhibit excellent soft magnetism may be used. The low noise of the recording medium can be achieved by using a soft magnetic amorphous material. As the soft magnetic amorphous material, for example, a Co alloy which contains Co as a main component and contains at least one of Zr, Nb, Hf, Ti, and Ta (e.g., CoZr, CoZrNb, and CoZrTa) may be selected.

An underlayer can be formed between the soft under layer and the substrate to improve the adhesion of the soft under layer. As the underlayer material, Ni, Ti, Ta, W, Cr, Pt, alloys thereof, oxides thereof, and nitrides thereof may be used. For example, NiTa, NiCr, and the like may be used. These layers may be formed of a plurality of the materials.

Further, an intermediate layer of a non-magnetic metal material may be formed between the soft under layer and the perpendicular magnetic recording layer. The intermediate layer has two roles of blocking an exchange bonding interaction between the soft under layer and the perpendicular magnetic recording layer and controlling the crystallinity of the perpendicular magnetic recording layer. The material of the intermediate layer may be selected from Ru, Pt, Pd, W, Ti, Ta, Cr, Si, alloys thereof, oxides thereof, and nitrides thereof.

The perpendicular magnetic recording layer may contain Co as a main component, contain at least Pt, and further contain a metal oxide. The layer may contain one or more elements selected from B, Ta, Mo, Cu, Nd, W, Nb, Sm, Tb, and Ru, in addition to Pt and Co. If the layer contains the elements, the microparticulation of the magnetic particles can be facilitated, and the crystallinity and orientation can be improved. Accordingly, recording/reproduction characteristics suitable for high recording density and thermal fluctuation characteristics can be obtained. Specifically, a CoPt-based alloy, a CoCr-based alloy, a CoCrPt-based alloy; and CoPtO, CoPtCrO, CoPtSi, CoPtCrSi, and $CoCrSiO_2$ alloys may be used for the perpendicular magnetic recording layer.

The thickness of the perpendicular magnetic recording layer can be set to 1.0 nm or more in order to measure a reproduced output signal with high accuracy. The thickness can be set to 40 nm or less in order to suppress intensity distortion of the signal. If the thickness is smaller than 1.0 nm, there is a tendency that a reproduced output is low and a noise component is dominant. On the other hand, when the thickness is larger than 40 nm, there is a tendency that the reproduced output becomes excessive and distortion in signal waveforms occurs.

A protective layer may be formed on the upper portion of the perpendicular magnetic recording layer. The protective layer is effective in preventing the corrosion and deterioration of the perpendicular magnetic recording layer and preventing damages on the surface of the medium when the magnetic recording head is in contact with the recording medium. Examples of protective layer materials include materials including C, Pd, $SiO_2$, and $ZrO_2$. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to $sp^2$-bonded carbon. Usually, carbon is deposited by sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness and therefore it is suitable as the protective layer for the magnetic recording layer.

A lubricant layer may be further formed on the upper portion of the protective layer. Examples of lubricants used for the lubricant layer include perfluoropolyether, fluoroalcohol, and fluorinated carboxylic acid. Thus, a perpendicular magnetic recording medium is formed on the substrate.

Process of Forming Mask Layer

A mask layer for transferring a convex pattern is formed on a magnetic recording layer.

When the protective layer is formed on the magnetic recording layer, the mask layer can be formed on the protective layer.

The mask layer becomes a main mask in the processing of the magnetic recording layer. Thus, a material to maintain the etching selectivity between the magnetic recording layer and the metal fine particle material as described below can be used. As a specific material, a material which is selected from the group consisting of Al, C, Si, Ti, V, Cr, Mn, Co, Ni, Cu, Fe, Zn, Ga, Zr, Nb, Mo, Ru, Pd, Ag, Au, Hf, Ta, W, Pt, and is comprised of compounds or alloys thereof may be applied for the mask layer. Here, the compound is selected from oxides, nitrides, borides, and carbides. The alloy is comprised of two or more materials selected from the above groups. In this case, the mask layer material which can ensure the etching selectivity between the material of the metal fine particle film formed on the mask layer and the size of the convex pattern is selected. Further, the film thickness can be appropriately determined.

These mask layers may be formed by vacuum deposition, electron-beam vacuum deposition, molecular-beam-deposition, ion-beam-deposition, ion plating, physical vapor deposition (PVD), chemical vapor deposition (CVD) using heat, light, and plasma, represented by spattering.

In the physical and chemical vapor deposition, the thickness of the mask layer can be adjusted by appropriately changing parameters such as the process gas pressure, the gas mass flow, the substrate temperature, the power supply, the ultimate vacuum, the chamber atmosphere, and the film formation time. The arrangement accuracy of the metal fine particle layer formed at the upper portion of the mask layer and the transfer accuracy of the convex pattern strongly depend on the surface roughness of the mask layer. Therefore, it is possible to previously reduce the surface roughness of the mask layer. This is achieved by variously adjusting the film formation conditions. In order to pattern a narrow pitch with high resolution, it is possible that the cycle of surface roughness based on a desired pattern pitch is shorter. The average surface roughness can be 0.6 nm or less. If the roughness is higher than 0.6 nm, the accuracy of arrangement of metal fine particles described below is worsened and the S/N signal from the magnetic recording medium tends to deteriorate.

It is possible to realize the reduction in the surface roughness by variously changing the film formation conditions and changing the material of the mask layer from a crystalline material to an amorphous material.

The thickness of the mask layer can be determined, taking into consideration the etching selectivity between the release layer and the magnetic recording layer and the size of the convex pattern. When the mask layer is formed, the adjustment is achieved by changing parameters such as the process gas pressure, the gas mass flow, the substrate temperature, the power supply, the ultimate vacuum, the chamber atmosphere, and the film formation time. As the sputtering gas used for the film formation, a rare gas including Ar may be mainly used. According to the mask material for forming the film, reactive gases such as $O_2$ and $N_2$ may be mixed to form a desired alloy film.

The thickness of the mask layer can be set to a range of 1 nm to 50 nm to transfer a fine pattern with high resolution. If the thickness is smaller than 1 nm, the mask layer is not uniformly formed, while if the thickness is larger than 50 nm, the transfer accuracy of the convex pattern in a depth direction tends to deteriorate.

As described below, the convex pattern is formed on the magnetic recording layer through the mask layer and then the mask layer is removed so that a magnetic recording layer having a concave pattern can be produced. Here, when the mask layer is removed, the method such as dry etching or wet etching is used. The release layer is previously formed between the mask layer and the magnetic recording layer and then the layer is removed so that the mask layer can be peeled off from the top of the magnetic recording layer. When the protective layer is formed on the magnetic recording layer, the release layer can be formed on the protective layer.

The release layer is peeled off by dry etching or wet etching. Eventually, the layer plays a role in removing the mask material from the top of the magnetic recording layer.

The material of the release layer may be selected from various inorganic materials and polymer materials. Any etching solution which can dissolve these materials may be appropriately selected.

Examples of inorganic materials to be used for the release layer include metals such as C, Mo, W, Zn, Co, Ge, Al, Cu, Au, Ag, Ni, Si, $SiO_2$, and Cr, compound, and alloys formed of two or more metals. These inorganic materials can be peeled off by dry etching using an etching gas such as $O_2$, $CF_4$, $Cl_2$, $H_2$, $N_2$ or Ar.

Further, acids such as hydrochloric acid, phosphoric acid, nitric acid, boric acid, acetic acid, hydrofluoric acid, ammonium fluoride, perchloric acid, hydrobromic acid, carboxylic acid, sulfonic acid, and hydrogen peroxide water; or a sodium hydroxide solution, a potassium hydroxide solution, a calcium hydroxide solution, a barium hydroxide solution, a magnesium hydroxide solution, an ammonium hydroxide solution, and alkali solutions such as tetramethylammonium hydroxide, tetrapropylammonium hydroxide, and phenyl trimethylammonium hydroxide may be used for each of the materials.

A buffer solution for adjusting the pH of each solution may be appropriately added.

Polymer materials are also used for the release layer. Examples thereof include novolak resin represented by a general-purpose resist material, polystyrene, polymethylmethacrylate, methylstyrene, polyethylene terephthalate, poly hydroxystyrene, polyvinyl pyrrolidone, and polymethyl cellulose. These resist materials can be peeled off using an organic solvent or water. In order to improve the etching resistance, it is possible to use the polymer materials and composite materials containing metals.

When the release layer is dissolved by the wet etching using an acid, an alkali, and an organic solvent, it is possible that the solubility rate of the magnetic recording layer and the substrate is sufficiently lower than the solubility rate of the release layer.

One or two layers of the mask layer can be formed. The magnetic recording layer and the mask layer on the release layer can be formed into, for example, a laminate including a first mask layer and a second mask layer. For example, the first mask layer and the second mask layer are formed of different materials so that the etching selectivity can be increased and the transfer accuracy can be improved. For convenience sake, the second mask layer is referred to as "transfer layer to the first mask layer. The magnetic recording layer, the mask layer, and the transfer layer are shown in this order from the substrate side.

The material of the transfer layer may be appropriately selected from various materials, taking into consideration the etching selectivity between the metal fine particle material and the mask layer material. When the combination of the mask material is determined, an etching solution or a metal material corresponding to the etching gas may be selected. When the dry etching is assumed and each material is combined, examples of the combination include C/Si, Si/Al, Si/Ni, Si/Cu, Si/Mo, Si/MoSi$_2$, Si/Ta, Si/Cr, Si/W, Si/Ti, Si/Ru, and Si/Hf in the order of the mask layer and the transfer layer from the substrate side. The configuration in which Si is replaced with $SiO_2$, $Si_3N_4$, SiC or the like may be used. Further, laminates such as Al/Ni, Al/Ti, Al/TiO$_2$, Al/TiN, Cr/Al$_2$O$_3$, Cr/Ni, Cr/MoSi$_2$, Cr/W, GaN/Ni, GaN/NiTa, GaN/NiV, Ta/Ni, Ta/Cu, Ta/Al, and Ta/Cr may be selected. Depending on the etching gas to be used in the mask processing, the stacking sequence of the various mask materials may be replaced.

The combination of the mask material and the stacking sequence are not limited thereto. From the viewpoint of the pattern size and the etching selectivity, they may be appropriately selected. Patterning can be performed by dry etching and wet etching. Thus, taking into consideration this, each mask material may be selected.

When the mask layer is patterned by wet etching, the side etch in the width direction of the convex pattern is suppressed. This is achieved by setting various parameters such as the composition of the mask material, the concentration and the etching time of the etching solution.

Process of Forming Resist Layer

Next, a resist layer for forming a convex pattern on a mask layer is formed.

In order to form a fine convex pattern on the resist layer, for example, resists for ultraviolet ray and electron beam exposure as represented by novolak resins, nanoimprint resists having a hardening action by heat or UV irradiation, polymeric self-assembled films, and metal fine particles can be used.

The resist layer to be used when performing exposure or nanoimprinting can be formed by applying a precursor solution of a resist material. In this case, the thickness of the resist layer can be determined by taking into consideration the pattern pitch and the etching selectivity with respective to the mask layer of the lower layer.

In the method for coating the coating liquid, the substrate can be coated by various methods such as spin-coating, spray-coating, spin-casting, dip-coating, and ink-jetting. Since the resist layer immediately after coating contains a large amount of solvent, it is possible to prebake the layer to decrease the fluidity of the resist material. When the adhesion of the resist layer to the mask layer is poor, the surface of the mask layer can be pretreated. Specific examples thereof include a baking process including removing water in the mask layer and a hydrophobing treatment based on coating with a hexamethyldisilazane solution.

The resist layer may have not only a single layer, but also a multilayer structure which is obtained by forming, for example, resist layers having different exposure sensitivity according to the transfer process.

The kind of the resist material is not particularly limited. Various resist materials such as main-chain-cut type, chemically-amplified type, and cross-linked type resists can be used.

A self-assembled layer for forming a convex pattern is formed on the upper portion of the mask layer, and then the resultant layer can be transferred to the convex pattern. The self-assembled film is represented by a diblock copolymer having at least two different polymer chains. The basic structure is such that terminals of polymers having different chemical characteristics are covalently bound, like (block A)-(block B). The self-assembled film is not limited to the diblock copolymer. Additionally, triblock and random copolymers can be used depending on the combination of the materials.

Examples of materials for forming polymer block include polyethylene, polystyrene, polyisoprene, polybutadiene, polypropylene, polydimethylsiloxane, polyvinyl pyridine, polymethylmethacrylate, poly butyl acrylate, polybutyl methacrylate, polydimethylacrylamide, polyethylene oxide, polypropylene oxide, polyacrylic acid, polyethylacrylic acid, polypropyl acrylic acid, polymethacrylic acid, polylactide, polyvinyl carbazole, polyethylene glycol, polycaprolactone, polyvinylidene fluoride, and polyacrylamide. Two or more different polymers of these examples are used to form a block copolymer.

A self-assembled film using a block copolymer can be formed on the mask layer by spin-coating. In this case, a solvent which dissolves the polymers forming each phase is selected. The solution in which the polymers are dissolved can be used as the coating liquid.

Specific examples of solvents include toluene, xylene, hexane, heptane, octane, ethylene glycol monoethyl ether, ethylene glycol monomethyl ether, ethylene glycol monomethyl ether acetate, propylene glycol monomethyl ether acetate, ethylene glycol trimethyl ether, ethyl lactate, ethyl pyruvate, cyclohexanone, dimethylformamide, dimethylacetamide, tetrahydrofuran, anisole, and diethylene glycol triethyl ether.

The thickness of the self-assembled film can be changed using the concentration of a coating liquid obtained using the solvents or various parameters set at the time of film formation.

When energy such as heat is applied to the self-assembled film, polymers are phase-separated, and a microphase-separated structure is formed in the film. The microphase-separated structure shows different conformations according to the molecular weight of the polymers forming the self-assembled film. For example, in the case of the diblock copolymer, an island-like dot or cylinder structure of a polymer B is formed on a sea-like (matrix) pattern of a polymer A. Additionally, a lamellar structure in which the polymers A and B are laminated on the same flat surface or a sphere structure in which sea-island patterns are reversed may be formed. One of the polymer phases in the pattern is selectively removed so that a convex pattern of the self-assembled film can be formed.

When the microphase-separated structure of the self-assembled film is formed, energy is applied from the outside. The energy can be applied by annealing with heat or so-called solvent annealing that exposes a sample to a solvent atmosphere. In thermal annealing, the temperature is set to a temperature which does not deteriorate the arrangement accuracy of the self-assembled film.

In order to improve the arrangement accuracy of the self-assembled pattern, the upper portion of the mask layer may be chemically modified. Specifically, any one of polymer phases forming a block copolymer is modified to the mask surface so that the arrangement of the block copolymer can be improved. In this case, the surface modification at a molecular level is achieved by applying, annealing, and rinsing the polymer. A pattern having excellent in-plane uniformity can be produced by applying the above block copolymer solution to this surface.

Alternatively, metal fine particles can be used as a mask so as to have a desired pattern pitch. When the metal fine particles are used as a mask layer, the fine particles themselves correspond to the convex portion of the mask layer. Thus, in a range which can maintain this state, it is possible to transfer the pattern to the lower portion. The use of the metal fine particle material allows for batch-patterning on a large area. As compared with conventional methods of forming a convex pattern including electron beam exposure, the process time can be greatly reduced. Further, when this is applied to the nanoimprinting process as described below, patterning in a large area can be performed at low cost.

When the metal fine particles are used as a convex pattern mask, it is possible that the metal fine particles are arranged to form a single layer over a large area on a substrate. Accordingly, the positional variation of the signal intensity in the magnetic recording medium can be reduced. Further, excellent glide characteristics are obtained because of a reduction of the abnormal projections after the transfer of the pattern.

As the metal fine particle mask, a mask obtained by arranging metal fine particles to form a single layer on a substrate is used.

When arranging the metal fine particles as the convex pattern mask on the substrate, a coating liquid prepared by dispersing the metal fine particles in a solvent, a so-called dispersion is used. Hereafter, it is referred to as "coating liquid". The coating liquid is a liquid in which at least one or more kinds of metal fine particles are monodispersed while the particles are located at regular intervals. The term "monodispersed" used herein means a state where the metal fine particles are not aggregated and attached to one another and they are independently present in the solution.

In order to stably disperse the metal fine particles in the solvent, the surfaces of the metal fine particles can be coated with a protective coating. The protective coating is defined to contain a surfactant and cover the surfaces of the metal fine particles. Further, it is possible that the affinity for the metal fine particle material is high.

The protective coating can be applied before dispersing metal fine particles refined by various methods in a dispersion medium. Depending on the production process, a method for adding the fine particles to the dispersion medium so as to redisperse the particles may be used.

The protective coating plays a role in suppressing the aggregation of metal fine particles due to a chemical effect of reducing the van der waals attraction between the metal fine particles as well as a physical effect caused by steric hindrance of polymer chains.

Specific examples of the protective coating include a thiol group, an amino group, a ketone group, a carboxyl group, an ether group, and a hydroxyl group. Specifically, alkanethiol, dodecanethiol, polyvinyl pyrrolidone, oleylamine, and the like can be used. Other examples thereof include polymeric materials such as sodium polycarboxylate and ammonium polycarboxylate.

As the metal fine particle material, a material formed of at least one kind selected from the group of C, Pt, Ni, Pd, Co, Al, Ti, Ce, Si, Fe, Au, Ag, Cu, Ta, Zr, Zn, Mo, W, and Ru, and alloys, mixtures, and oxides of two or more kinds selected from the above group may be used.

Regarding the size of the metal fine particles, metal fine particles having an average particle diameter of 2 to 50 nm may be used. This is because if the average particle diameter of the fine particles is smaller than 2 nm, the production becomes more difficult, if the average particle diameter is larger than 50 nm, the peeling of a fine particle mask having a multilayer structure is insufficient and the surface smoothness is impaired.

The solvent for dispersing the metal fine particles may be selected from various organic solvents. Specific examples thereof include toluene, xylene, hexane, heptane, octane, ethylene glycol monoethyl ether, ethylene glycol monomethyl ether, ethylene glycol monomethyl ether acetate, propylene glycol monomethyl ether acetate, ethylene glycol trimethyl ether, ethyl lactate, ethyl pyruvate, tetradecane, cyclohexanone, dimethylformamide, dimethylacetamide, tetrahydrofuran, anisole, diethylene glycol triethyl ether, ethanol, methanol, isopropanol, and water.

The metal fine particles and the solvents are mixed to obtain a metal fine particle coating liquid. When the aggregation of the fine particles occurs, the metal fine particles can be dispersed by using a method such as ultrasonic dispersion after the mixing.

A dispersant for facilitating the monodispersion of the metal fine particles may be added to the metal fine particle coating liquid. The dispersant can be appropriately selected according to the combination of the protective coating and the solvent. For example, it can be selected from sodium polycarboxylate, polycarboxylic acid ammonium, amine polycarboxylate, poly alkylamine, and polyamine. In the process of preparing fine particles, the particle diameter of secondary particles generated by aggregation is relatively large. This leads to the impairment of the uniformity of the pattern. Thus, it is possible that the dispersion is appropriately filtered through a membrane filter.

It is possible to change the solvent of the dispersion so as to correspond to the surface properties of the mask layer. In order to minimize the macroscopic unevenness of the coating, i.e., a region where the metal fine particles are not uniformly coated, it is possible to improve coating properties by adding a binder comprised of a polymer material to the dispersion. It is possible to select a polymer material which is soluble in the solvent of the dispersion to prepare the dispersion.

As binders, various polymer materials may be added to the metal fine particle coating liquid. Accordingly, the coating properties to the mask layer can be improved, and the adherence of the pattern to the underlayer can be enhanced.

The polymer materials used for the binders may be ones which are dissolved in the solvent of the coating liquid. Usable examples thereof include polystyrene, polymethylmethacrylate, polyvinyl alcohol, and polyvinyl pyrrolidone.

The metal fine particle coating liquid containing the metal fine particles mono-dispersed in these solvents is dropped and applied onto the mask layer.

Similarly to a resist solution or a polymer solution of a self-assembled film, the metal fine particle dispersion can be applied to the substrate by various methods including spin coating. In this case, if the metal fine particles focally have a multilayer structure, the transfer uniformity is impaired. Accordingly, it is possible to adjust coating conditions so that a large area on the substrate has a single layer structure.

The amount of the coating liquid which is dropped onto the mask layer may be set to an amount which is enough to cover a desired coating area. When the metal fine particle layer is formed into a multilayer, the solution concentration, the solution viscosity, and the coating conditions may be variously adjusted. For example, in the spin-coating, the rotating speed of coating can be set to 10000 rpm or less to form a multilayer structure in a large area. If the rotating speed is 10000 rpm or more, the defect area in the metal fine particles is expanded, and it tends to be difficult to form a single layer. When the metal fine particles are coated by spin-coating, the defect area in the metal fine particles can be reduced at intermediate and outer circumferences as compared with the inner circumference. Thus, the S/N signal shows an excellent value at intermediate and outer circumferences as compared with the inner circumference.

Further, when a pretreatment is performed on the surface of the mask layer, the affinity for the metal fine particle coating liquid can be increased and the coating properties of the metal fine particle coating liquid, (i.e., in-plane uniformity) can be improved. For example, a method for heating a substrate and applying a silane coupling agent may be used. Additionally, a method for forming a polymer material having a high affinity for a solvent on a mask layer may be used.

The adherence of the fine particles can be enhanced by performing a suitable post-treatment on the substrate coated with the metal fine particles. Specifically, a method comprising heating the substrate to remove the solvent in the coating liquid is listed. In this case, it is possible to previously set the temperature to a temperature which does not thermally decompose the protective coating around the fine particles.

As described below, when metal fine particles are used as a convex pattern, there is a problem such that the transfer accuracy of the pattern is significantly deteriorated by the aggregation of the fine particles formed during processing such as etching. Then, the aggregation can be reduced by introducing the following process.

Specifically, the process of forming a convex pattern mask of metal fine particles which can reduce the aggregation comprises: (1) arranging the metal fine particles on the substrate as described above; (2) forming an overcoat film which physically adheres the metal fine particles; and (3) irradiating with energy beams to deactivate a protective coating of fine particles.

Metal fine particles are arranged to form a single layer on a substrate, and then an overcoat film which covers the metal fine particles is formed. The overcoat film is a thin film which covers the metal fine particle surface and the protective coating as described above.

The overcoat film is a film which allows the metal fine particles arranged on the same flat surface to be uniformly adhered. When the protective coating and the lower layer of the mask layer are etched, the fine particles aggregate with the deactivation of the protective coating due to the plasma exposure or heating. On this subject, it is possible to suppress the aggregation due to the application of energy which is required for deactivation of protective groups by previously allowing the metal fine particles to be adhered to the overcoat film. The material of the overcoat film is formed in a gap between the protective coatings, and thus it is adhered to the metal fine particle surface. Thus, the layer has also an aggregation suppressing effect by decreasing the chemical activity of the metal fine particles.

The overcoat film may be selected from various materials. For example, similarly to the above metal fine particle materials, the material may be selected from groups such as C, Pt, Ni, Pd, Co, Al, Ti, Ce, Si, Fe, Au, Ag, Cu, Ta, Zr, Zn, Mo, W, Ru, and Ge. Further, it may be selected from alloys of the groups and compounds such as oxides and nitrides.

Further, the overcoat film plays a role in deactivating a protective group when energy beams described below are transmitted. Thus, the thickness of the film can be thinner than a thickness which blocks the energy beams. It can be 10 nm or less from the viewpoint of the production process. When it is difficult to form the overcoat film into a thin film, the film is previously formed into a thick film and then the resulting film may be thinned by etching or the like.

Subsequently, the protective coating of the metal fine particles is deactivated. Specifically, the polymer chains (protective coating) are cut by external irradiation with energy beams.

If the metal fine particles lose the protective coating, with the irradiation with energy beams, the particles immediately aggregate when a gap between the adjacent fine particles is a free space. However, even if the protective coating is deactivated, the aggregation is suppressed because of physical adherence by the overcoat film as described above. The gap between the protective coatings, namely, the overcoat film formed on the metal fine particle surface decreases the chemical activity of the metal fine particles. Thus, the metal fine particles are in a state in which the aggregation is suppressed.

Energy beams can be selected from various beams. Usable examples thereof include ultraviolet rays, electron beams, and X-rays. When irradiating with energy beams, it may be performed in vacuum or in an inert gas atmosphere such as He or Ar. From the viewpoint of the tact time, ultraviolet rays may be suitably used as the energy beams which can be simply emitted.

The energy which is irradiated with energy beams can be appropriately set according to various parameters such as wavelengths and applied voltages.

A concave pattern formed of metal fine particles is formed on a mask by etching the overcoat film and removing the film.

As described above, the overcoat film formed of various materials can be easily removed by selecting a suitable etching gas. As described below, each mask layer to be used as a lower layer is batch-processed to form the convex pattern.

A series of processes including forming an overcoat film, irradiating with energy beams, and processing the overcoat film may be repeated two or more times. It may be performed until the aggregation of the metal fine particles is suppressed.

Process of Patterning Mask Layer

Subsequently, the metal fine particles as the convex pattern are transferred to the mask layer.

In the processing of the mask layer, various layer configurations and processing methods can be achieved by the combination of the mask layer material and the etching gas.

When the fine processing is performed so that the etching in the thickness direction is more significant than the etching in the width direction of the concave-convex pattern, the dry etching can be used. Plasmas used for dry etching can be generated by various methods such as capacitive coupling, inductive coupling, electron cyclotron resonance, and multi-frequency superposition coupling. In order to adjust the size of the convex pattern, parameters such as the process gas pressure, the gas mass flow, the plasma power supply, the bias power, the substrate temperature, the chamber atmosphere, and the ultimate vacuum can be set.

When the mask material is stacked to increase the etching selectivity, the etching gas may be appropriately selected. Examples of the etching gas include fluorine-based gases, such as $CF_4$, $C_2F_6$, $C_3F_6$, $C_3F_8$, $C_5F_8$, $C_4F_8$, $ClF_3$, $CCl_3F_5$, $C_2ClF_5$, $CCBrF_3$, $CHF_3$, $NF_3$, and $CH_2F_2$; and chlorine-based gases, such as $Cl_2$, $BCl_3$, $CCl_4$, and $SiCl_4$. In addition, various gases, such as H2, $N_2$, $O_2$, $Br_2$, HBr, $NH_3$, CO, $C_2H_4$, helium, Ne, Ar, Kr, and Xe may be used. In order to adjust the etching rate and the etching selectivity, a mixed gas obtained by mixing two or more of these gases may be used. The patterning may be performed by wet etching. In this case, it is possible to select an etching solution which can ensure the etching selectivity and control the etching in the width direction. Similarly, a physical etching process like ion milling may be performed.

As described above, a transfer layer can be formed between the mask layer and the resist layer in order to improve the transfer accuracy of the pattern. Furthermore, the convex pattern of the resist layer is transferred to the transfer layer, followed by removal of the resist layer. Then, the convex pattern may be transferred to the mask layer.

Dry etching or wet etching can be used in order to remove the resist layer from the top of the transfer layer. For example, an organic resist material and the like can be easily removed from the top of the transfer layer by wet etching with an organic solvent. When a mask containing metal is used, it is possible to perform wet etching by appropriately selecting a solution capable of dissolving metal. Accordingly, it is possible to suppress the aggregation during processing, such as the case of the metal fine particles, and reduce the clogging of the concave portion caused by the adhesion of by-products by etching or deterioration in the transfer accuracy. If the resist material can be selectively removed, the dry etching may be performed.

The transfer layer may have various configurations, taking into consideration the etching selectivity with respect to the resist layer. As described above, for example, the layer may be comprised of C/Si, Ta/Al, Al/Ni or Si/Cr from the substrate side.

When an interval between resist convex patterns is significantly narrow, an interval between fine particles may be adjusted by intentionally etching the convex portion of the resist. Specific examples of the etching method include a method for increasing the side etch in dry etching and a method for adjusting the incidence angle of the ions in ion milling and slimming metal fine particles in the width direction. As described above, the convex pattern of the resist layer can be transferred to the mask layer.

In addition to the above method for providing a convex pattern on a resist layer, there is also a method for using nanoimprint lithography. Specifically, a substrate or a mask pattern on the substrate is used as a template to produce a nanoimprint stamper. The resultant stamper is used to transfer a convex pattern to a resist layer on a magnetic recording medium. Various materials can be used for the convex pattern of the resist layer as the template. Here, a method for using metal fine particles which achieves simple production and low cost will be described.

A method for producing a stamper according to one embodiment includes: forming metal fine particles on a substrate; forming an overcoat film which covers the metal fine particles; irradiating with energy beams to deactivate a protective coating around the metal fine particles; forming a convex pattern using the metal fine particles as a mask; forming a conductive layer having a convex pattern on the convex pattern of the metal fine particles; forming an electroformed layer using the conductive layer as an electrode; and peeling off the conductive layer to form a stamper formed of the electroformed layer having the convex pattern transferred thereonto. Further, a method for producing a magnetic recording medium using the method includes:

forming a magnetic recording layer on a substrate;
forming a mask layer on the magnetic recording layer;
forming an imprint resist layer on the mask layer;
transferring a convex pattern onto the imprint resist layer using a stamper;
transferring the convex pattern to the mask layer;
transferring the convex pattern to the magnetic recording layer; and
removing the mask layer from the top of the magnetic recording layer.

The nanoimprint lithography is a process including pressing a nanoimprint stamper having a fine convex pattern formed on its surface (hereafter referred to as "stamper") against a resist layer for transferring to transfer the pattern. In the process, a resist pattern can be batch-transferred to a large area of the sample as compared with techniques such as step and repeat mode of ultraviolet ray exposure and electron beam exposure. Therefore, the production throughput is increased, and thus it is possible to achieve a decrease in the production time and a reduction in cost.

The stamper can be obtained from a substrate comprising a fine convex pattern, i.e., a so-called master disc (a mold or a master). In many cases, the stamper is produced by subjecting the fine pattern of the master disc to electroforming. As the substrate for the master disc, a semiconductor substrate doped with impurities such as Si, $SiO_2$, SiC, SiOC, $Si_3N_4$, C, B, Ga, In, and P may be used. Additionally, a substrate formed of a material having conductivity may be used. Further, the shape of the substrate is not limited to the three-dimensional shapes, and it may be circular, rectangular or toroidal.

As for the pattern of the master disc, the metal fine particles may be used as the convex pattern as described above. The pattern obtained by transferring the metal fine particle pattern to the mask layer may be used as a pattern for electroforming. Further, the convex pattern is transferred to the master disc in some way and the resulting pattern may be used as the pattern for electroforming.

Subsequently, the convex pattern of the master disc is subjected to electroforming to form a stamper. Examples of electroformed, i.e., plated-metal include various materials. Here, as an example, a method for producing a stamper formed of Ni will be described.

In order to give the conductivity to the convex pattern of the master disc, a conductive film is formed on the surfaces of the metal fine particles having a single layer structure. In the electroforming process as described below, if poor electric conduction is caused, the plating growth is inhibited, thereby leading to pattern defects. Accordingly, it is possible that the conductive film is uniformly formed on the surface of the convex pattern and the side surface. However, when a conductive material is used for the metal fine particles and the substrate, it is not limited thereto. The convex pattern can have electrical continuity. In this case, the conductive film may be formed on the top portion and side surface of a metal fine particle and gaps between the particles.

The conductive film may be selected from various materials. Examples of the materials of the conductive film include Ni, Al, Ti, C, Au, and Ag. Here, examples using Ni will be explained.

The conductive film formed on the metal fine particle may be integrated with the metal fine particle pattern.

Subsequently, the master disc is immersed in a sulfamic-acid Ni or NiP bath and energized, followed by electroforming to form an electroformed layer as a stamper on the conductive film. The film thickness after plating, i.e., the thickness of the stamper can be adjusted by changing the energizing current value and the plating time, in addition to the hydrogen ion concentration, temperature, and viscosity of the plating bath. The electroforming process can be performed by electrolytic plating or non-electrolytic plating.

A stamper thus obtained is released from the substrate. When the metal fine particle layer remains on the surface of the convex pattern of the stamper, the metal fine particles remained as residues are removed by etching on the surface of the convex pattern, resulting in exposure of the convex pattern. Alternatively, a process of selecting a releasing liquid which is hardly-soluble against the stamper and readily-soluble against the metal fine particles and wet-etching using the liquid may be performed. Finally, unnecessary portions other than the surface of the convex pattern are mechanically removed, and the stamper is further processed into a desired shape such as a circular or rectangular shape, resulting in completion of the stamper.

As a modification of the process of forming a nanoimprint stamper, a mask layer is formed on a substrate and further a convex pattern can be transferred to the mask layer. As described above, the material of the mask layer used herein may be any material as long as it can ensure the etching selectivity between the material and the metal fine particles. The mask layer may have a two or more multilayer structure. Further, it is also possible to produce a stamper by transferring the convex pattern to the substrate through the mask layer and using the master disc having the substrate to which the convex pattern is transferred.

The stamper is used as an alternative to the master disc so that a duplicated stamper can be produced. In this case, examples of the production method include a method for producing an Ni stamper from an Ni stamper, a method for producing a resin stamper from an Ni stamper or the like. Here, a method for producing a resin stamper which is relatively cost-effective and easy to produce will be described.

The resin stamper is produced by injection molding. First, the Ni stamper is loaded in an injection molding machine. A resin solution material is flowed onto the convex pattern of the stamper, followed by injection molding. As the resin solution material, a cycloolefin polymer, polycarbonate, polymethylmethacrylate or the like may be used. Further, a material having good peel properties with respect to the imprint resist as described below may be selected. After the injection molding, the sample is peeled off from the top of the Ni stamper to obtain a resin stamper having a convex pattern.

The convex pattern can be transferred by using the resin stamper. As described above, a sample in which the magnetic recording layer and the mask layer are formed in this order from the substrate side is used and further the imprint resist layer is formed on the mask layer. The resultant product is used as the sample. Various resist materials such as heat-curing and photo-curing resins may be used for the imprint resist. For example, isobornyl acrylate, allyl methacrylate, and dipropylene glycol diacrylate may be used.

These resist materials are applied to the sample having the magnetic recording layer and the mask layer on the substrate to form a resist layer. Subsequently, a resin stamper having a convex pattern is imprinted on the resist layer. If the resin stamper is pressed against the resist in the imprinting process, the resist is fluidized to form a convex pattern. Here, if energies such as ultraviolet rays are applied to the resist layer to cure the resist layer having the convex pattern thereon and then the resin stamper is released, the convex pattern of the resist layer is obtained. In order to easily release the resin stamper, the surface of the resin stamper may be subjected to a releasing treatment using a silane coupling agent.

Subsequently, the resin stamper to which an imprint resist is pressed is released. After the release of the resin stamper, the resist material remains as a residue in a recess portion of the resist layer. Thus, the surface of the mask layer is exposed by removing the material by etching. Since the polymer-based resist material has generally low etching resistance to the $O_2$ etchant, the residue can be easily removed by dry etching using an $O_2$ gas. When an inorganic material is included, the etching gas can be appropriately changed so as to allow the resist pattern to remain. The convex pattern is transferred to the mask layer and the magnetic recording layer, and then a magnetic recording medium having a convex pattern can be produced by nanoimprint lithography through the process of forming the protective film.

Process of Patterning Magnetic Recording Layer

Next, the convex pattern is transferred to the magnetic recording layer at the lower portion of an alloy release layer.

Examples of a typical method for forming isolated magnetic dots include the reactive ion etching and milling methods. Specifically, the patterning can be performed by the reactive ion etching method using CO or $NH_3$ as an etching gas or by the ion milling method using an inert gas such as He, Ne, Ar, Xe or Kr.

In the process of patterning the magnetic recording layer, a relation between the etching rate of the mask layer (ERmask) and the etching rate of the magnetic recording layer (ERmag) satisfies a relation: ERmask≤ERmag. That is, in order to obtain a desired thickness of the magnetic recording layer, the regression of the mask layer caused by etching can be smaller.

When the concave pattern is transferred to the magnetic recording layer by ion milling, it is necessary to reduce by-products scattering to the mask side surface (so-called redeposition components). The redeposition components are adhered to the periphery of the convex pattern mask, and thus the size of the convex pattern is expanded and the groove portion is buried. Accordingly, in order to obtain a divided magnetic recording layer pattern, it is possible that the redeposition components are reduced as much as possible. If the deposition components generated at the time of etching of the magnetic recording layer at the lower portion of the release layer cover the side surface of the release layer, the release layer is not exposed to the peeling solution. As a result, the peel properties are deteriorated. Consequently, after all, it is possible that the redeposition components are few.

When the magnetic recording layer is subjected to the ion milling method, the redeposition components scattering to the side surface can be reduced by changing the incidence angle of ions. In this case, although an optimal incidence angle varies depending on the mask height, the redeposition components can be reduced by changing the angle in a range of 20° to 70°. The incidence angle of ions may be appropriately changed during milling. For example, a method including milling processing a magnetic recording layer at an ion incident angle of 0°, changing the ion incident angle, and selectively removing the redeposition part of the convex pattern is used.

Process of Removing and Peeling Off Mask Layer

After transferring the convex pattern to the magnetic recording layer, the mask layer present on the magnetic recording layer is removed. If the mask layer is not removed and remained the surface of medium, this leads to an abnormal projection pattern. Thus, crashes of the scanning head scanning are caused. Consequently, it is possible that the mask layer is removed as much as possible.

The mask layer can be removed by dry etching or wet etching. When the dry etching is used, the etching gas type which can remove the mask layer material is appropriately selected.

As described above, the release layer is formed between the magnetic recording layer and the mask layer, and the mask layer may be lifted off by dissolving and removing the release layer. When the release layer is chemically removed by dry etching, particles attached on the mask layer are remained as a pattern. Finally, this results in deterioration in the surface properties of the medium. When the release layer is dissolved by wet etching, the mask layer and the particles are lifted off. Thus, they are completely removed from the surface of the medium, resulting in a reduction of deterioration of the surface properties of the medium. Therefore, when the mask on the magnetic recording layer is removed, wet etching can be performed.

As described above, the release layer contains a metal material which is soluble in an acidic or alkali solution. Accordingly, it is possible to appropriately select an etching solution which can dissolve the metal material. Examples of acid stripping solutions include hydrochloric acid, phosphoric acid, nitric acid, boric acid, perchloric acid, hydrobromic acid, carboxylic acid, sulfonic acid, and hydrogen peroxide water.

Examples of alkali stripping solutions include sodium hydroxide solutions, potassium hydroxide solutions, potassium hydroxide solutions, calcium hydroxide solutions, barium hydroxide solutions, magnesium hydroxide solutions, ammonium hydroxide solutions, hydrazine, tetramethylammonium hydroxide, tetrapropylammonium hydroxide, and phenyltrimethylammonium hydroxide. A buffer solution for adjusting the pH of each solution may be appropriately added.

When the release layer is dissolved by wet etching, it is possible to allow the solubility rate for the magnetic recording layer and the substrate to be sufficiently lower than that for the release layer.

Process of Forming Protective Layer

After removing the mask layer on the magnetic recording layer, a protective layer is formed on the convex pattern. This protective film plays a role in preventing the corrosion of the convex-patterned magnetic recording layer and preventing the abrasion of the surface of the medium caused during head scanning.

In the case where the protective film is formed on a narrow pitch pattern, when the film is simply formed, a thickness difference occurs between the protective film on the convex pattern and the protective film on the concave pattern portion. There is a problem such that flying characteristics of the head are deteriorated. When only the concave pattern is embedded with the protective film material to smooth the surface, it is difficult to smooth the surface in the subsequent process, and the location dependence of the roughness difference between the concave-convex portions becomes significant. This leads to a problem of deterioration in the surface smoothness of the medium. Therefore, it is difficult to completely fill the convex pattern of the narrow pitch pattern with the protective film material. Simultaneously, there is a problem such that the surface smoothness after embedding is deteriorated.

On the other hand, like the above production method, when the protective film is formed on the convex pattern by oblique film formation, the protective film can be uniformly formed on the pattern without impairing the surface smoothness of the surface of the medium.

As described above, the pattern of the magnetic recording layer has a periodic convex shape and can have various structures. Examples thereof include a cylindrical shape, a conical shape, a prismatic shape, a pyramidal shape, a polygonal column shape, a polygonal pyramid shape. The shape of all the dot patterns on the substrate is not necessary to be a single shape. The dots having the above shapes may be mixed on the substrate not depending on the numbers and kinds.

The pattern pitch which can form an excellent protective film is 20 nm or less. This is because, if the pitch is larger than the value, the protective film uniformly covers the side surface of the dot and the bottom surface, and it becomes impossible to embed the convex pattern. Here, the pitch is a distance between the center of a convex dot pattern on a substrate and the center of the adjacent convex patterns. Hence, the term "periodic" means a state where the pitch is continued twice or more based on a certain dot. It is possible that the dot pattern on the medium is uniformly arranged in-plane. The pitch and dot size have variations, i.e., dispersions. The dispersion value can be 20% or less in order to allow the S/N signal from the medium to be highly sensitive.

Even if the pitch is not periodic due to the pattern defects and is discontinued with a discontinuous value at a certain portion, the pitch should to be periodic again. The discontinuity is caused by, for example, defects of the convex pattern of the resist. Specifically, in the case of the electron beam resist pattern, the discontinuity corresponds to a pattern defect caused by poor electron beam lithography and poor development. In the case of the self-assembled diblock copolymer material, it corresponds to a so-called domain region where the self-assembled pattern is macroscopically discontinuous. In the case of the metal fine particle pattern, it corresponds to a defect region of the fine particles which are not arranged on a mask. In the case of nanoimprint, it corresponds to a defect caused by poor transfer of an imprint. In each case, even if a discontinuous region is once formed, there is no particular problem on the configuration of the medium as long as a periodic pattern is arranged again.

The protective film material can be selected from various materials, and it can be a non-magnetic material. Specifically, it is selected from Al, Si, C, Ti, V, Cr, Mn, Cu, Zn, Ge, Y, Zr, Mo, Pd, Ag, Hf, W, Pt, and Au. It can be comprised of alloys of those metals or compounds such as oxides and nitrides. When the carbon material is used, a DLC film containing a large amount of $sp^3$-bonded carbon is suitable.

The thickness of the protective film material can be 5 nm or less in order to achieve the improvement of the S/N signal by reduction of magnetic spacing. This is because a thickness of greater than 5 nm causes difficulty in electromagnetic signal conversion. In order to allow coatability on the convex pattern to be excellent, the thickness can be greater than 0.1 nm. If the thickness is less than 0.1 nm, the coatability becomes poor.

The protective film is produced by oblique film formation of the protective film material on the convex pattern of the magnetic recording layer. In the case of the oblique film formation of the protective film material on the surface of the substrate, there are methods such as a method for arranging a sample jig so as to be inclined to a fixed protective film material source, a method for inclining and arranging a sample substrate loaded in a jig, and a method for inclining and arranging a protective film material source to a fixed substrate material. At this time, the angle for the oblique film formation may be appropriately changed in the middle of formation of the protective film and it is possible to set a plurality of irradiation angles. For example, during the film formation, the irradiation angle may be changed to $\theta 1$, $\theta 2$, $\theta 3$, ..., or the like.

In the method for forming a film based on the oblique film formation, it is possible to use, for example, vacuum deposition, sputtering or ion beam deposition. The substrate having a sample applied thereon during the film formation is allowed to rotate or the sample jig is allowed to revolve along the material source, so that the film formation uniformity of the irradiated protective film material can be improved.

Further, the protective film material is formed into a thick film by oblique incidence, and then a process of reducing the thickness of the film by etching may be performed in order to reduce the surface roughness. Specifically, wet and dry etching can be used. In order to ensure the process margin on the in-plane uniformity and the thin film, it is possible to use dry etching. The process of reducing the thickness of the film can be variously combined with the process of forming a film by oblique incidence. For example, the protective film material is formed by oblique incidence at a certain angle $\theta 1$, the thickness of the film is reduced by dry etching, oblique incidence is performed at an angle $\theta 2$ to reduce the convex pattern, and dry etching is performed again to reduce the thickness of the film.

It is possible to form a protective film material on the protective film material formed by oblique incidence by another method. For example, a solution containing a protective film material is applied, followed by oblique incidence to produce a flat protective film. Further, a protective film can be formed on the flat protective film. Thus, the roughness difference between the concave-convex portions caused by oblique incidence can be reduced. After the coating and the film formation, the dry etching may be performed to adjust the thickness of the protective film to a desired value.

The solution containing the protective film material can be applied by various methods. Various methods such as spin-coating, dip-coating, spin-casting, Langmuir Blodgett technique, and ink-jetting can be applied.

In the protective film formed on the magnetic recording layer, a portion between the convex-convex patterns of the magnetic recording layer is bridge-bonded. Therefore, a portion surrounded by the portion between the magnetic recording layers and the protective film at the upper portion is a gap region.

The gap region allows the roughness difference between the concave-convex portions on the surface of the medium to be small. Thus, when the head is flying, an air eddy is not generated at the concave pattern. Therefore, air turbulence i.e., wind disturbance at the surface of the medium is reduced. Thus, the drop of the head to the surface of the substrate due to the air eddy and pressure differences is suppressed. Accordingly, vibrations during head scanning are reduced, flying stability is improved, the frequency at which the surface of the medium comes into contact with the head is decreased, and head crashes can be prevented.

The gaps can be comprised of air, vacuum, and inert gas atmospheres. For example, the gap region can be substituted by gas atmosphere required during the film formation. Specific examples of the gas include He, $N_2$, Ar, and Ne.

Depending on the position of the periodic pattern of the magnetic recording layer, the protective layer has a different thickness. Specifically, when, in the distance X-X' where the patterns are most close to each other, the thickness of the protective layer at the upper portion of the dot is t1 and the thickness of the protective layer between the dots is t2, in the distance Y-Y' where the patterns are most distant from each other, the thickness of the protective layer between the dots is t3, the condition is $t1 \leq t2 \leq t3$.

Finally, the fluorine-based lubricating film (not shown) is formed on the protective film so that a magnetic recording medium having a convex patterned magnetic recording layer comprised of a protective film which is bonded to the upper surface of the layer can be obtained. Usable examples of lubricants include perfluoropolyether, fluoroalcohol, and fluorinated carboxylic acid.

Figure 19:
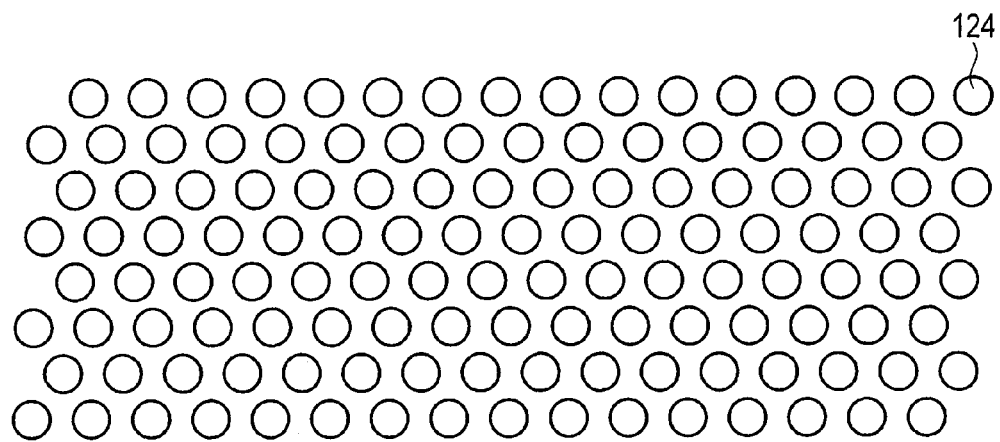
FIG. 19 is a view showing an example of a recording bit pattern in a circumferential direction of a magnetic recording medium.

FIG. 19 shows a view showing an example of a record bit pattern in a circumferential direction of a magnetic recording medium.

In FIG. 19, the whole servo area, which is a data area in the magnetic recording medium and positioning information of the magnetic head, is comprised of a periodic pattern. At this time, the dot number for recording and reproducing one bit may be singular or plural.

Figure 20:
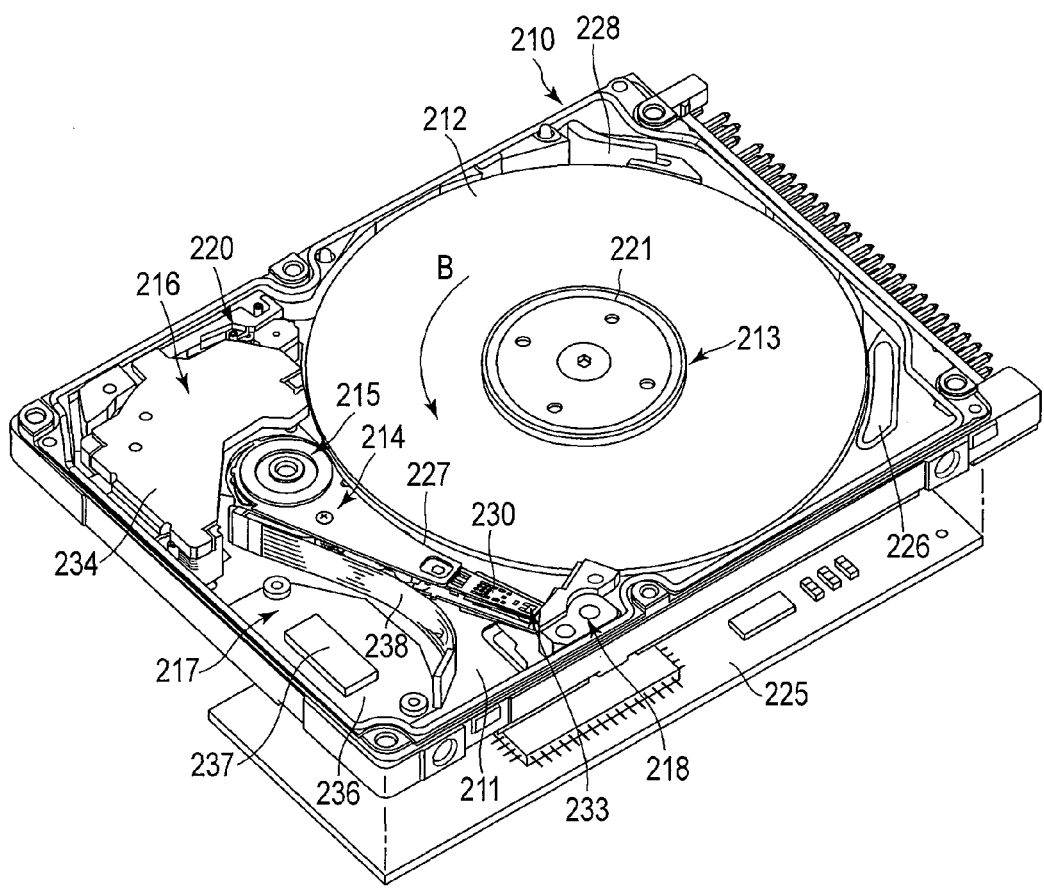
FIG. 20 is a partially disassembled perspective view of a magnetic recording/reproducing device to which the magnetic recording medium according to the embodiment can be applied.

FIG. 20 is a partially disassembled perspective view of a magnetic recording/reproducing device to which the magnetic recording medium according to the embodiments can be applied.

The same drawing shows the internal structure in which the top cover of the hard disk drive according to the embodiment is detached as a disk device. As shown in the drawing, the HDD comprises a case 210. The case 210 comprises a rectangular box-shaped base 211 having an open upper surface and a rectangular plate-shaped top cover (not shown). The top cover is screwed to the base 211 with a plurality of screws and thereby closes the top opening of the base 211. As a result, the inside of the case 210 is kept air-tight and can exchange air with the outside only through a breathing filter 226.

A magnetic disk 212 (recording medium) and a driving unit are provided on the base 211. The driving unit comprises a spindle motor 213 which supports and rotates the magnetic disk 212, a plurality of (e.g., two) magnetic heads 233 which record and reproduce information on and from the magnetic disk 212, a head actuator 214 which supports the magnetic heads 233 in such a manner that they are movable with respect to the surfaces of the magnetic disk 212, and a voice coil motor (hereinafter referred to as "VCM") 216 which rotates and positions the head actuator 14. A lamp loading mechanism 218 which holds, at a position that is spaced from the magnetic disk 212, the magnetic heads 233 when they have been moved to the outermost periphery of the magnetic disk 212, an inertia latch 220 which holds the head actuator 214 at an escape position when the HDD has received impact or the like, and a board unit 217 which is mounted with electronic components such as a preamplifier and a head IC are also provided on the base 211.

A control circuit board 225 is screwed to the external surface of the base 211 so as to be opposed to the bottom wall of the base 211. The control circuit board 225 controls operations of the spindle motor 213, the VCM 216, and the magnetic heads 233 via the board unit 217.

In FIG. 20, the magnetic disk 212 is configured as the perpendicular magnetic recording medium having the convex pattern formed by the above processing method. The magnetic disk 212 has, for example, a substrate 219 which is formed into a disc shape having a diameter of about 2.5 inch and is comprised of a nonmagnetic material. A soft magnetic layer 223 as an underlayer is formed on each surface of the substrate 219 and a perpendicular magnetic recording layer 222 having magnetic anisotropy in a perpendicular direction to the disc surface is formed on the soft magnetic layer 223. Further, a protective film 224 is formed thereon.

The magnetic disk 212 is fitted with the hub of the spindle motor 213 concentrically, and is clamped by a clamp spring 221 screwed to the top end of the hub and is thereby fixed to the hub. The magnetic disk 212 is rotationally driven by the spindle motor 213 (drive motor) in the direction indicated by an arrow B at a predetermined speed.

The head actuator 214 comprises a bearing unit 215 which is fixed to the bottom wall of the base 211 and a plurality of arms 227 which extend from the bearing unit 215. The arms 227 are spaced from each other by a predetermined interval and extend in the same direction from the bearing unit 215 parallel with the surfaces of the magnetic disk 212. The head actuator 214 comprises suspensions 230 each of which is elastically deformable and is shaped like a long and narrow plate. Each suspension 30, which is a leaf spring, extends from the corresponding arm 227 with its base end portion spot-welded or bonded to the tip portion of the arm 227. A magnetic head 233 is supported by the extending end of each suspension 230 through a gimbal spring 241. Each suspension 230, the gimbal spring 241, and the magnetic head 233 constitutes a head gimbal assembly. The head actuator 214 may have a configuration comprising a so-called E block in which a sleeve of the bearing unit 215 is integrated with the arms.

EXAMPLES

Hereinafter, examples will be shown, and the embodiments will be specifically described.

Example 1

C Protective Layer, EB Lithography

First, a method comprising forming a convex pattern on a resist layer by electron-beam lithography and transferring the pattern to a magnetic recording layer will be described.

A 2.5 inch-diameter toroidal substrate was used as the substrate, and the magnetic recording layer was formed on the substrate by the DC sputtering method. Ar was used as the process gas, the gas pressure was set to 0.7 Pa, the gas mass flow was set to 35 sccm, and the power supply was set to 500 W. A 10-nm thick NiTa underlayer, a 4-nm thick Pd underlayer, a 20-nm thick Ru underlayer, and a 5-nm thick CoPt recording layer were formed in this order from the substrate side. Finally, a 3-nm thick Pd protective layer was formed to obtain a magnetic recording layer.

Subsequently, an underlayer for reducing the roughness of the release layer was formed on the magnetic recording layer. Here, the Pd film was selected and the layer was formed so as to have a thickness of 1.5 nm by the DC sputtering method. Here, in order to intentionally increase the roughness, the process gas pressure was increased up to 4.0 Pa to form a film, and thus a Pd film having a surface roughness of 0.32 nm was obtained. Subsequently, a metal release layer was formed on the underlayer. In this example, Mo soluble in acid was selected as the release layer and the Mo film was formed by the DC sputtering method so as to have a thickness of 5 nm.

Then, the mask layer was formed on the release layer. In order to transfer the convex pattern of the resist layer with high resolution, a two-layered mask was used. A 30-nm-thick C was used as the first mask layer from the substrate side and a 5-nm-thick Si was used as the transfer layer at the upper portion. In the formation of each mask layer, a facing-targets sputtering system was used and each film was formed by spattering under the conditions of Ar gas flow rate of 35 sccm, Ar gas pressure of 0.7 Pa, and power supply of 500 W.

Then, a principal chain breaking-type electron beam positive resist for patterning was formed. As the electron beam resist, ZEP-520A (ZEON CORPORATION) was used. The resist was diluted in anisole as the solvent at a weight ratio of 1:3 (ZEP-520A: anisole) to prepare a diluted solution. Thereafter, the diluted solution was dropped onto the substrate. The substrate was spin-coated at a rotating speed of 2500 rpm so as to have a thickness of 30 nm. The sample was maintained on a vacuum hot plate heated to 180° C. for 150 seconds, and the electron beam resist was cured by prebaking.

Then, a pattern was drawn on the electron beam resist using an electron beam lithography system having a ZrO thermal field-emission electron source and beams with an accelerating voltage of 100 kV and a beam diameter of 2 nm. The electron beam lithography system is a so-called x-θ type lithographic system provided with signals used to form a writing pattern and with a one-way moving mechanism and rotating mechanism of a sample stage. In the drawing on the sample, the signals used to polarize electron beams are synchronized and the stage is moved in a radial direction. Here, a latent image of a dot/space pattern and line/space pattern at a pitch of 20 nm was formed on the electron beam resist under the conditions: drawing linear velocity: 0.15 m/sec, beam current value: 13 nA, and feed per revolution in the radial direction: 5 nm.

Development of the mask layer allows a convex pattern (10 nm-diameter dot and 5 nm-space, 10 nm-width line and 10 nm-width space) to be resolved. As the developer, an organic developer containing 100% normal amyl acetate as a component as was used. The electron beam resist was developed by immersing the sample in the solution for 20 seconds.

Then, the sample was rinsed by immersing the sample in isopropyl alcohol for 20 seconds. The surface of the sample was dried by directly blowing $N_2$.

The process of transferring the convex pattern to the mask layer was performed by dry etching. In the dry etching, the inductively-coupled plasma etching with $CF_4$ gas and $O_2$ gas was used. In order to transfer the convex pattern to the Si transfer layer at the lower resist portion, the resist convex pattern was transferred by etching under the conditions of $CF_4$ gas pressure of 0.1 Pa, gas mass flow of 20 sccm, power supply of 100 W, and bias power of 10 W for 40 seconds. Subsequently, $O_2$ gas was used to etch the C mask layer. The convex pattern was transferred by etching under the conditions of gas pressure of 0.1 Pa, gas mass flow of 20 sccm, power supply of 100 W, and bias power of 20 W for 40 seconds.

Next, the convex pattern was transferred to the release layer and the magnetic recording layer. As described above, in the process of transferring the convex pattern to the release layer and the magnetic recording layer, the layers may be separately patterned through different etching processes or the same process. Here, an Ar ion milling method was used. The milling was performed under the conditions of Ar ion acceleration voltage of 300 V, gas mass flow of 3 sccm, process pressure of 0.1 Pa, and incident angle of ions on the surface of the substrate of 90° (perpendicular incidence) for 110 seconds to transfer the convex pattern to a 6-nm-thick Pd/W alloy release layer and a 5-nm-thick CoPt recording layer.

Subsequently, the mask pattern was removed by wet stripping. As described above, the W alloy layer capable of removing acid was used as the release layer, and thus the wet stripping was performed using hydrogen peroxide water. The hydrogen peroxide water was prepared to have a concentration of 1 wt %, and the sample was immersed therein for 3 minutes. Subsequently, the sample was washed with pure water for 5 minutes to clean up the surface of the medium. As a result, the mask layer and the release layer were removed from the top of the magnetic recording layer.

Next, a protective layer was formed. As described above, the protective layer is formed on the upper portion of the convex-convex pattern of the magnetic recording layer by oblique incidence. Here, C was selected as the protective layer material, and the C film was formed by the DC sputtering method under the conditions of gas pressure of 2 Pa, power supply of 200 W, and irradiation angle of 72° so as to have a thickness of 2 nm.

Finally, a perfluoro polyether-based lubricating film was formed so as to have a thickness of 1.5 nm similarly to Example 3, and a magnetic recording medium having a convex pattern was obtained.

In order to confirm the sectional shape of the obtained magnetic recording medium, the upper surface was subjected to the SEM observation, and a periodic pattern having a polygonal shape could be clearly confirmed. Further, a cross sectional TEM image was taken, which showed a trapezoidal magnetic recording layer pattern having a 5-nm height convex pattern. In order to confirm the protective layer region, the EELS analysis was performed. Here, when a region without the protective layer material was 0 and a region filled with the protective layer material was 1, the concentration of elements was identified by obtaining a relative value of the detected strength. The result showed that the C protective layer was present on the convex-convex pattern of the magnetic recording layer and the upper portion, and gaps were formed between the recording layers. At this time, the results of the detected amounts of elements in the protective layer showed that the concentration of the protective layer material in the surface of the magnetic recording layer was as high as 98 atom %.

The flying height of the head from the obtained magnetic recording medium was measured with a glide height tester and flying characteristics were evaluated. As a result, the measurement height exceeded a flying height of 10 nm which is the standard required to perform the read/write evaluation process.

Finally, the recording/reproduction characteristics of the media were evaluated by measuring the electromagnetic conversion characteristics by using a read/write analyzer RWA1632 and a spinstand S1701MP (manufactured by GUZIK, U.S.A.). The recording/reproduction characteristics were evaluated by using a head provided, at the writing portion thereof, with a shielded pole type magnetic pole which is a shield-attached single pole type magnetic pole (the shield acts to converge the magnetic flux to be emitted from a magnetic head) and also provided, at the reading portion thereof, with a TMR element, and measuring the signal-to-noise ratio (SNR) with the condition of recording frequency being set to 1200 kBPI in linear recording density. As a result, a value of 12.3 dB (as the SNR value of the medium) was obtained.

As a result, it is found that the flying characteristics of the head and the in-plane uniformity of the convex pattern are excellent.

Example 2

C Protective Layer, Self-Assembly Lithography

Example 2 was performed similarly to Example 1 except that, as a resist layer, a self-assembled film was used in place of ZEP-520A to form a microphase-separated structure, etching based on the microphase-separated pattern was performed, and an Si/C film was further inserted between the self-assembled film and a mask layer to allow the transfer of the pattern of the self-assembled film and the mask layer to be excellent.

First, a carbon film for transferring the self-assembled pattern was formed so as to have a thickness of 3 nm on an Si transfer layer. Here, the film formation was performed by the DC sputtering method under the conditions of Ar gas pressure of 0.7 Pa and power supply of 500 W.

Then, a block copolymer solution was first applied onto a carbon film. As the block copolymer solution, a solution prepared by dissolving a block copolymer of polystyrene and polydimethylsiloxane in a coating solvent was used. The molecular weights of polystyrene and polydimethylsiloxane are 11700 and 2900, respectively. A microphase-separated structure having a pattern pitch of 20 nm is obtained from this composition. Propylene glycol monomethyl ether acetate was used as the solvent to prepare a polymer solution having a percentage by weight concentration of 1.5%.

The solution was dripped onto a carbon film mask. The spin coating was performed at a rotating speed of 5000 rpm and a self-assembled film was formed using a single self-assembled film having a thickness of 18 nm. The single self-assembled film does not have a layered structure on the same flat surface of the medium, and means that the microphase-separated pattern of the sea-like polystyrene and the island-like polydimethylsiloxane is single-layered. In the self-assembled film being spin-coated, the wettability of the coating liquid on the surface of the mask layer during coating is dependant on the location. Thus, macroscopic defects of the self-assembled pattern are reduced on the outer periphery side rather than the inner periphery side. This is largely related to the radial dependence of the S/N signal below.

Further, the sea-like polystyrene and the island-like polydimethylsiloxane dot pattern are microphase-separated in the self-assembled film and thus thermal annealing was performed. In the thermal annealing, annealing was performed at 170° C. for 12 hours (in a reduced pressure atmosphere, furnace pressure: 0.2 Pa) using a vacuum furnace to form a microphase-separated structure having a pitch dot of 20 nm in the self-assembled film.

Then, etching was performed using the phase-separated pattern as a base pattern to form a convex pattern. The etching was performed by inductively coupled plasma reactive ion etching. The process gas pressure was set to 0.1 Pa, and the gas mass flow was set to 5 sccm.

In order to remove polydimethylsiloxane of the surface layer of the self-assembled film, etching using $CF_4$ gas as an etchant was performed under the conditions of antenna power of 50 W and bias power of 5 W for 7 seconds. Subsequently, in order to transfer the convex pattern to the sea-like polystyrene and the C film of the lower portion of the self-assembled film, etching using $O_2$ gas as an etchant was performed under conditions of antenna power of 100 W and bias power of 5 W for 110 seconds. Since the $O_2$ etchant used for the removal of polystyrene etches the C film at the lower portion, the Si transfer layer becomes a stopper layer to stop the etching. Similarly to Example 1, etching was performed on the Si transfer layer at the lower portion and the C mask layer by plasma etching using the $CF_4$ etchant and the $O_2$ etchant to transfer the convex pattern of the self-assembled film to the mask layer.

Hereafter, the process of transferring the pattern and the peeling process were performed similarly to Example 1 to obtain a magnetic recording medium having a convex pattern.

An upper SEM photographic image of the obtained magnetic recording medium is shown in FIG. 23.

As shown in the same drawing, it is found that the surface of the substrate is densely filled with magnetic recording dots having a polygonal shape. The pitch of the magnetic recording dots is about 20 nm. Dot defects are focally observed. However, there is no impact of the periphery of the defect area on the pitch.

FIG. 24 shows a cross sectional TEM photographic image of the obtained magnetic recording medium.

The convexo-concave of the drawing is a produced CoPt dot pattern and the upper portion is covered with a C protective layer formed by oblique irradiation. The C protective layer covers the upper portion of dots and the concave portion so as to form a bridge. It can be confirmed that there is a gap region without the protective layer material between the convex patterns.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.1 dB (as the SNR value of the medium) was obtained. It was found that the signal SNR at the outer periphery was more excellent than those at the inner periphery and the intermediate periphery and it was 12.8 dB.

Example 3

C Protective Layer, Metal Fine Particle Lithography

Example 3 is a process of forming a magnetic recording layer, a mask layer, and a metal fine particle layer on a substrate, and then transferring a convex pattern to the magnetic recording layer. As described below, Examples 1 to 4 are examples in which the type of energy beams being emitted and the irradiation atmosphere are changed in order to remove and deactivate the protective coating of the periphery of the metal fine particle layer.

A 2.5 inch-diameter toroidal substrate was used as the substrate, and the magnetic recording layer was formed on the substrate by the DC sputtering method. Ar was used as the process gas, the gas pressure was set to 0.7 Pa, the gas mass flow was set to 35 sccm, and the power supply was set to 500 W. A 10-nm thick NiTa underlayer, a 4-nm thick Pd underlayer, a 20-nm thick Ru underlayer, and a 5-nm thick CoPt recording layer were formed in this order from the substrate side. Finally, a 3-nm thick Pd protective layer was formed to obtain a magnetic recording layer.

Then, the mask layer was formed on the Pd protective layer. Here, a three-layered mask was used to transfer the convex pattern of the metal fine particle layer with high resolution. A 30-nm thick C layer as the first mask layer, a 5-nm thick Si layer as the transfer layer at the upper portion, and a 3-nm thick C layer as the third mask layer were formed in this order from the substrate side. In the formation of each mask layer, a facing-targets sputtering system was used and each film was formed by spattering under the conditions of Ar gas flow rate of 35 sccm, Ar gas pressure of 0.7 Pa, and power supply of 500 W.

Subsequently, a coating liquid for forming the metal fine particle mask was produced. As the coating liquid, one prepared from a mixture of a dispersion of metal fine particles and a high polymer binder was used.

As the metal fine particles, Au particles having an average particle diameter of 8 nm whose surfaces were coated with an alkanethiol group were used. Polystyrene having an average molecular weight of 2800 was used as the high polymer binder. The binder and the particles were mixed so as to have a weight ratio (Au:polystyrene) of 2:3. The resultant mixture was diluted at a concentration of 3.5 wt % with toluene as a solvent to prepare a solution. Finally, the metal fine particle solution was dispersed using an ultrasonic dispersion machine and the monodispersion of the fine particles was facilitated to produce a coating liquid. When the metal fine particles are monodispersed, the dispersant of fine particles, (i.e., a surfactant) may be added.

Subsequently, a metal particulate resist layer was formed on a C film. An appropriate amount of the produced metal fine particle coating liquid was dropped onto the C film, followed by spin coating at a rotating speed of 4500 rpm to form a metal fine particle layer on the substrate. Similarly to the self-assembled film of Example 2, macroscopic defects of the metal fine particle layer after spin-coating are reduced on the outer periphery side rather than the inner periphery side. Further, the substrate was baked to remove the dispersion medium from the metal fine particle layer, and thus the adherence with the substrate was enhanced. The baking process was performed using a hot plate. The temperature was 140° C. and the retention time was 5 minutes.

Subsequently, an overcoat film was formed on the metal fine particle layer. When the overcoat film is uniformly covered from the upper surface of the metal fine particle layer, the overcoat film plays a role in allowing the fine particles to be adhered. The C film was used for the overcoat film.

The C film was formed by the DC sputtering method under the conditions of gas pressure of 0.7 Pa, gas mass flow of 35 sccm, and power supply of 500 W so as to have a thickness of 3 nm from the metal fine particle surface.

Then, the top of the overcoat film was irradiated with energy beams. When irradiated with energy beams, the energy beams which were transmitted through the overcoat film were illuminated to the protective coating around the metal fine particles. Thus, the polymer chains forming the protective coating were cleaved and the activity of the metal fine particles was reduced. Additionally, the material of the overcoat film was adhered to the surfaces of the metal fine particles so as to fill the protective coating gap. Thus, the aggregation after processing was hardly caused.

Here, energy beams were used as ultraviolet rays and the irradiation with energy beams was performed in a vacuum atmosphere. In the irradiation process, a sample was placed in a vacuum vessel, and then the inside of the vessel was evacuated. When the degree of vacuum reached $10^{-2}$ Pa, the vessel was irradiated with ultraviolet rays for 30 seconds. Thereafter, venting of the vessel was performed with $N_2$ gas and the sample was recovered. The wavelength of ultraviolet rays to be irradiated was 365 nm. The value is not limited to this example and ultraviolet rays having various wavelengths may be emitted.

Subsequently, the overcoat film at the upper portion of the metal fine particle layer and the C film at the lower portion of the metal fine particles are removed by dry etching using an $O_2$ etchant at one time. In the dry etching, the inductively-coupled plasma etching was used. The etching was performed under the conditions of pressure of 0.1 Pa, gas mass flow of 20 sccm, power supply of 40 W, and bias power of 40 W for 8 seconds to transfer the pattern to the C mask. The time required for coating the metal fine particles and transferring the metal fine particle pattern, namely, a tact time is about 38 minutes. This example is an example in which the tact time can be greatly shortened as compared with the comparative examples described below. The production throughput can be improved.

After the transfer of the convex pattern to the C film, it is possible to transfer the pattern to the lower layer using the metal fine particles as a mask. In order to completely suppress the aggregation of the fine particles formed during processing, the fine particles may be removed from the top of the substrate. Here, the metal fine particles were dissolved and removed after transfer of the convex pattern to the C mask.

An aqueous solution comprised of iodine, potassium iodide, and water was used to dissolve the Au particles. The solution was prepared at a weight ratio of 1:2:3. Subsequently, the sample was immersed in the mixed solution for 10 seconds, followed by washing with running ultrapure water for 60 seconds. Thus, the metal fine particle layer was dissolved and removed from the substrate.

In the following examples, unless otherwise noted, the process of removing the metal fine particles from the substrate after transfer of the convex pattern at the lower portion of the metal fine particle layer is included.

Subsequently, the pattern was transferred to the lower-layer Si and the C mask. The pattern was transferred by the inductively-coupled plasma etching. In the process of transferring the convex pattern to an Si film, etching using $CF_4$ gas as an etchant was performed under the conditions of gas pressure of 0.1 Pa, gas mass flow of 20 sccm, power supply of 100 W, and bias power of 30 W for 5 seconds.

The pattern was transferred to the lower-layer C mask. In the process of transferring the pattern to the C film, the convex pattern was transferred to the mask layer by etching using an $O_2$ etchant under the conditions of gas pressure of 0.1 Pa, gas mass flow of 20 sccm, power supply of 40 W, and bias power of 40 W for 28 seconds.

Subsequently, the convex pattern was transferred to the magnetic recording layer. Here, an Ar ion milling method was used. The convex pattern was transferred to a 5 nm-thick CoPt recording layer and a 3 nm-thick Pd layer by milling under the conditions: Ar ion acceleration voltage; 300 V, gas mass flow of 3 sccm, process pressure: 0.1 Pa, and incidence angle of ions to the substrate: 90° (vertical incidence) for 65 seconds. Further, in order to remove the remained mask layer, the mask layer was removed from the top of the magnetic recording layer by milling under the conditions: Ar ion acceleration voltage; 100 V, gas mass flow of 3 sccm, process pressure: 0.1 Pa, and incidence angle of ions to the substrate: 90° (vertical incidence) for 5 seconds.

Hereafter, a protective layer was formed similarly to Example 1. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.8 dB (as the SNR value of the medium) was obtained. It was found that the signal SNR at the outer periphery was more excellent than those at the inner periphery and the intermediate periphery and it was 13 dB.

Example 4

C Protective Layer, Metal Fine Particle Lithography

Example 4 was performed similarly to Example 3 except that an Si layer was added as the transfer layer on the mask layer.

The Si transfer layer was formed to have a thickness of 3 nm by the DC sputtering method under the conditions of gas pressure of 0.7 Pa and power supply of 500 W. The processing of the Si transfer layer was performed by inductively-coupled plasma etching with $O_2$ etchant. The etching was performed under the conditions of pressure of 0.1 Pa, gas mass flow of 20 sccm, power supply of 100 W, and bias power of 30 W for 7 seconds to transfer the convex pattern.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.4 dB (as the SNR value of the medium) was obtained.

Example 5

Al Protective Layer, Metal Fine Particle Lithography

Example 5 was performed similarly to Example 1, except that Al was used as a material for obliquely forming a protective layer.

The Al protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11 dB (as the SNR value of the medium) was obtained.

Example 6

Si Protective Layer, Metal Fine Particle Lithography

Example 6 was performed similarly to Example 4, except that Si was used as a material for obliquely forming a protective layer.

The Si protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.1 dB (as the SNR value of the medium) was obtained.

Example 7

Ti Protective Layer, Metal Fine Particle Lithography

Example 7 was performed similarly to Example 4, except that Ti was used as a material for obliquely forming a protective layer.

The Ti protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.8 dB (as the SNR value of the medium) was obtained.

Example 8

V Protective Layer, Metal Fine Particle Lithography

Example 8 was performed similarly to Example 4, except that V was used as a material for obliquely forming a protective layer.

The V protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.1 dB (as the SNR value of the medium) was obtained.

Example 9

Cr Protective Layer, Metal Fine Particle Lithography

Example 9 was performed similarly to Example 4, except that Cr was used as a material for obliquely forming a protective layer.

The Cr protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12 dB (as the SNR value of the medium) was obtained.

Example 10

Mn Protective Layer, Metal Fine Particle Lithography

Example 10 was performed similarly to Example 4, except that Mn was used as a material for obliquely forming a protective layer.

The Mn protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.8 dB (as the SNR value of the medium) was obtained.

Example 11

Cu Protective Layer, Metal Fine Particle Lithography

Example 11 was performed similarly to Example 4, except that Cu was used as a material for obliquely forming a protective layer.

The Cu protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.2 dB (as the SNR value of the medium) was obtained.

Example 12

Zn Protective Layer, Metal Fine Particle Lithography

Example 12 was performed similarly to Example 4, except that Zn was used as a material for obliquely forming a protective layer.

The Zn protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.5 dB (as the SNR value of the medium) was obtained.

Example 13

Ge Protective Layer, Metal Fine Particle Lithography

Example 13 was performed similarly to Example 4, except that Ge was used as a material for obliquely forming a protective layer.

The Ge protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.9 dB (as the SNR value of the medium) was obtained.

Example 14

Y Protective Layer, Metal Fine Particle Lithography

Example 14 was performed similarly to Example 4, except that Y was used as a material for obliquely forming a protective layer.

The Y protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.8 dB (as the SNR value of the medium) was obtained.

Example 15

Zr Protective Layer, Metal Fine Particle Lithography

Example 15 was performed similarly to Example 4, except that Zr was used as a material for obliquely forming a protective layer.

The Zr protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.2 dB (as the SNR value of the medium) was obtained.

Example 16

Mo Protective Layer, Metal Fine Particle Lithography

Example 16 was performed similarly to Example 4, except that Mo was used as a material for obliquely forming a protective layer.

The Mo protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.6 dB (as the SNR value of the medium) was obtained.

Example 17

Pd Protective Layer, Metal Fine Particle Lithography

Example 17 was performed similarly to Example 4, except that Pd was used as a material for obliquely forming a protective layer.

The Pd protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.8 dB (as the SNR value of the medium) was obtained.

Example 18

Ag Protective Layer, Metal Fine Particle Lithography

Example 18 was performed similarly to Example 4, except that Ag was used as a material for obliquely forming a protective layer.

The Ag protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.3 dB (as the SNR value of the medium) was obtained.

Example 19

Hf Protective Layer, Metal Fine Particle Lithography

Example 19 was performed similarly to Example 4, except that Hf was used as a material for obliquely forming a protective layer.

The Hf protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.2 dB (as the SNR value of the medium) was obtained.

Example 20

W Protective Layer, Metal Fine Particle Lithography

Example 20 was performed similarly to Example 4, except that W was used as a material for obliquely forming a protective layer.

The W protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.5 dB (as the SNR value of the medium) was obtained.

Example 21

Pt Protective Layer, Metal Fine Particle Lithography

Example 21 was performed similarly to Example 4, except that Pt was used as a material for obliquely forming a protective layer.

The Pt protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12 dB (as the SNR value of the medium) was obtained.

Example 22

Au Protective Layer, Metal Fine Particle Lithography

Example 22 was performed similarly to Example 4, except that Au was used as a material for obliquely forming a protective layer.

The Au protective layer was obliquely formed so as to have a thickness of 2 nm by the DC sputtering method.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.9 dB (as the SNR value of the medium) was obtained.

Example 23

C Protective Layer, Metal Fine Particle Lithography, Film Thickness of 3 nm

Example 23 was performed similarly to Example 3, except that C was used as a material for obliquely forming a protective layer and the thickness was 3 nm.

Similarly to Example 3, the C protective layer was formed so as to have a thickness of 3 nm by the DC sputtering method under the conditions of gas pressure of 2 Pa, power supply of 200 W, and C irradiation angle to the pattern surface of 72°.

Hereafter, similarly to Example 3, the convex pattern was transferred to the mask layer and the magnetic recording layer, the mask layer was removed with a solution, and the protective layer material was obliquely formed into a film. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 10.7 dB (as the SNR value of the medium) was obtained.

Example 24

C Protective Layer, Metal Fine Particle Lithography, Film Thickness of 3 nm

Example 24 was performed similarly to Example 23, except that C was used as a material for obliquely forming a protective layer and the thickness was 3 nm.

Similarly to Example 23, the C protective layer was formed so as to have a thickness of 4 nm by the DC sputtering method under the conditions of gas pressure of 2 Pa, power supply of 200 W, and C irradiation angle to the pattern surface of 72°.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 9.8 dB (as the SNR value of the medium) was obtained.

Example 25

C Protective Layer, Metal Fine Particle Lithography, Irradiation Angle of 40°

Example 25 was performed similarly to Example 3 except that an obliquely forming angle of a protective layer to be formed on a medium was changed to 40°.

Similarly to Example 3, a sample was loaded into a disk jig having a rotating mechanism facing the irradiation source for the protective layer material, and the sample was disposed at an irradiation angle of 40°.

After that, similarly to Example 3, the convex pattern was transferred to the mask layer and the magnetic recording layer, the mask layer was removed by a solution, and the protective layer material was formed into a film by an oblique film formation method. The obtained C protective film had a thickness of 2 nm. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.5 dB (as the SNR value of the medium) was obtained.

Example 26

C Protective Layer, Metal Fine Particle Lithography, Irradiation Angle of 50°

Example 26 was performed similarly to Example 3 except that an obliquely forming angle of a protective layer to be formed on a medium was changed to 50°.

Similarly to Example 3, a sample was loaded into a disk jig having a rotating mechanism facing the irradiation source for the protective layer material, and the sample was disposed at an irradiation angle of 50°.

After that, similarly to Example 3, the convex pattern was transferred to the mask layer and the magnetic recording layer, the mask layer was removed by a solution, and the protective layer material was formed into a film by an oblique film formation method. The obtained C protective film had a thickness of 2 nm. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.2 dB (as the SNR value of the medium) was obtained.

Example 27

C Protective Layer, Metal Fine Particle Lithography, Irradiation Angle of 60°

Example 27 was performed similarly to Example 3 except that an obliquely forming angle of a protective layer to be formed on a medium was changed to 60°.

Similarly to Example 3, a sample was loaded into a disk jig having a rotating mechanism facing the irradiation source for the protective layer material, and the sample was disposed at an irradiation angle of 60°.

After that, similarly to Example 3, the convex pattern was transferred to the mask layer and the magnetic recording layer, the mask layer was removed by a solution, and the protective layer material was subjected to an oblique film formation method. The obtained C protective film had a thickness of 2 nm. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12 dB (as the SNR value of the medium) was obtained.

Example 28

C Protective Layer, Metal Fine Particle Lithography, Irradiation Angle of 70°

Example 28 was performed similarly to Example 3 except that an obliquely forming angle of a protective layer to be formed on a medium was changed to 70°.

Similarly to Example 3, a sample was loaded into a disk jig having a rotating mechanism facing the irradiation source for the protective layer material, and the sample was disposed at an irradiation angle of 70°.

After that, similarly to Example 3, the convex pattern was transferred to the mask layer and the magnetic recording layer, the mask layer was removed by a solution, and the protective layer material was subjected to an oblique film formation method. The obtained C protective film had a thickness of 2 nm. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.4 dB (as the SNR value of the medium) was obtained.

Example 29

C Protective Layer, Metal Fine Particle Lithography, Irradiation Angle of 80°

Example 29 was performed similarly to Example 3 except that an obliquely forming angle of a protective layer to be formed on a medium was changed to 80°.

Similarly to Example 3, a sample was loaded into a disk jig having a rotating mechanism facing the irradiation source for the protective layer material, and the sample was disposed at an irradiation angle of 80°.

After that, similarly to Example 3, the convex pattern was transferred to the mask layer and the magnetic recording layer, the mask layer was removed by a solution, and the protective layer material was subjected to an oblique film formation method. The obtained C protective film had a thickness of 2 nm. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.4 dB (as the SNR value of the medium) was obtained.

Example 30

C Protective Layer, Metal Fine Particle Lithography, Pitch of 18 nm

Example 30 was performed similarly to Example 3 except that a metal fine particle layer having an average particle diameter of 12 nm and a pitch of 18 nm was used to transfer a convex pattern to a magnetic recording layer.

In this example, Au was used as metal fine particles. Similarly to Example 3, Au was prepared and applied to form a particle layer on a substrate. Further, a protective layer was formed, and the layer was irradiated with energy beams. The convex pattern was transferred to the magnetic recording layer.

C was used as the protective layer material and the irradiation angle was set to 80 to form a film having a thickness of 2 nm.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 7.2 dB (as the SNR value of the medium) was obtained.

Example 31

C Protective Layer, Metal Fine Particle Lithography, Pitch of 13 nm

Example 31 was performed similarly to Example 30 except that a metal fine particle layer having an average particle diameter of 9 nm and a pitch of 13 nm was used to transfer a convex pattern to a magnetic recording layer.

In this example, Au was used as metal fine particles. Similarly to Example 3, Au was prepared and applied to form a particle layer on a substrate. Further, a protective layer was formed, and the layer was irradiated with energy beams. The convex pattern was transferred to the magnetic recording layer.

C was used as the protective layer material and the irradiation angle was set to 80 to form a film having a thickness of 2 nm.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 11.6 dB (as the SNR value of the medium) was obtained.

Example 32

C Protective Layer, Metal Fine Particle Lithography, Pitch of 8 nm

Example 32 was performed similarly to Example 30 except that a metal fine particle layer having an average particle diameter of 5.5 nm and a pitch of 8 nm was used to transfer a convex pattern to a magnetic recording layer.

In this example, Au was used as metal fine particles. Similarly to Example 3, Au was prepared and applied to form a particle layer on a substrate. Further, a protective layer was formed, and the layer was irradiated with energy beams. The convex pattern was transferred to the magnetic recording layer.

C was used as the protective layer material and the irradiation angle was set to 80 to form a film having a thickness of 2 nm.

After that, similarly to Example 3, the convex pattern was transferred to the mask layer and the magnetic recording layer, the mask layer was removed by a solution, and the protective layer material was subjected to an oblique film formation method. Finally, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The signal/noise ratio of the medium was measured using the spin stand. As a result, a value of 12.8 dB (as the SNR value of the medium) was obtained.

Example 33

C Protective Layer, Metal Fine Particle Lithography, Irradiation Angle: Changed from 60° to 0°

Example 33 was performed similarly to Example 3 except that an obliquely forming angle of a protective layer material was gradually changed. This example shows an example in which the obliquely forming angle is changed from 60 to 0°.

In obliquely forming the protective layer, a 1.3-nm thick C film was formed at an irradiation angle of 60°, and then a 0.7-nm thick C film was formed at an irradiation angle of 0° (i.e., by counter irradiation). Thus, a C protective layer having a total thickness of 2 nm was formed.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 10.5 dB (as the SNR value of the medium) was obtained.

Example 34

C Protective Layer, Metal Fine Particle Lithography, Irradiation Angle: Changed from 70° to 0°

Example 34 was performed similarly to Example 3 except that an obliquely forming angle of a protective layer material was gradually changed. This example shows an example in which the obliquely forming angle is changed from 70 to 0°.

In obliquely forming the protective layer, a 0.9-nm thick C film was formed at an irradiation angle of 70°, and then a 1.1-nm thick C film was formed at an irradiation angle of 0° (i.e., by counter irradiation). Thus, a C protective layer having a total thickness of 2 nm was formed.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 10.7 dB (as the SNR value of the medium) was obtained.

Example 35

C Protective Layer, Metal Fine Particle Lithography, Irradiation Angle: Changed from 80° to 0°

Example 35 was performed similarly to Example 3 except that an obliquely forming angle of a protective layer material was gradually changed. This example shows an example in which the obliquely forming angle is changed from 80 to 0°.

In obliquely forming the protective layer, a 0.9-nm thick C film was formed at an irradiation angle of 80°, and then a 1.1-nm thick C film was formed at an irradiation angle of 0° (i.e., by counter irradiation). Thus, a C protective layer having a total thickness of 2 nm was formed.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 11 dB (as the SNR value of the medium) was obtained.

Example 36

C Protective Layer, Metal Fine Particle Lithography, Thinning of Thickened Film

Examples 36 to 37 are examples in which a protective layer material is obliquely formed into a thick film in advance, and the resultant film is thinned by etching to obtain a protective layer having a desired thickness. The mask layer, the metal fine particle layer, the process of transferring the convex pattern from the metal fine particle layer to the magnetic recording layer, and the process of peeling the mask are the same as those in Example 3.

C was used as the protective layer material and a film having a thickness of 40 nm was formed by the DC sputtering method at an irradiation angle of 70°. Then, the C film was thinned by etching. Here, the inductively-coupled plasma etching with $O_2$ etchant was used. The gas pressure was set to 0.1 Pa, the antenna power was set to 40 W, and the bias power was set to 40 W, and etching was performed for an etching time of 47 seconds to form a 2-nm-thick C protective layer.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. At this time, the location dependence of the protective layer material in the surface of the medium was smaller than that of the medium obtained by irradiating the protective layer with light at a single angle, and a medium having a small difference between the convex patterns was obtained.

The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 12 dB (as the SNR value of the medium) was obtained.

Example 37

C Protective Layer, Metal Fine Particle Lithography, Thinning of Thickened Film

Example 37 was performed similarly to Example 36 except that the obliquely formed film of the protective layer material was thinned by ion-milling.

C was used as the protective layer material and a film having a thickness of 10 nm was formed by the DC sputtering method at an irradiation angle of 70°. Then, the C film was thinned by etching. Here, an Ar ion milling method was used. A 2-nm-thick C protective layer was formed by ion-milling under the conditions of gas pressure of 0.1 Pa, gas mass flow of 8 sccm, and accelerating voltage of 300 V for 336 seconds.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. At this time, the location dependence of the protective layer material in the surface of the medium was smaller than that of the medium obtained by irradiating the protective layer with light at a single angle, and a medium having a small difference between the convex patterns was obtained.

The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 11.6 dB (as the SNR value of the medium) was obtained.

Example 38

C Protective Layer, Metal Fine Particle Lithography, Formation Id SOC Film after Film Formation Example 38 is an example in which a C protective layer is obliquely formed and further a spin-on-carbon film is formed on the C protective layer. The formation of the convex pattern and the formation of the protective layer by sputtering in this example are the same as those in Example 3.

First, a 1-nm-thick C protective layer was obliquely formed. Subsequently, a spin-on-carbon solution was spin-coated on a medium to uniformly form a film having a thickness of 2 nm. In order to remove the solvent in the spin-on-carbon film thus formed, the film was baked on a hot plate at 140° C. for 5 minutes. This was a post-treatment.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. At this time, since the concave portion of the protective layer on the surface of the medium was filled with the spin-on carbon, the roughness was smaller than that of the medium obtained by irradiating the protective layer with light at a single angle, and a medium having a small difference between the convex patterns was obtained.

The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 11 dB (as the SNR value of the medium) was obtained.

Example 39

C Protective Layer, Metal Fine Particle Lithography, Formation of SOC Film after Film Formation, Followed by Thinning of Film Example 38 is an example in which a C protective layer is obliquely formed, a spin-on-carbon film is formed on the C protective layer, and then the resultant film is further thinned by etching. The formation of the convex pattern and the formation of the protective layer by sputtering in this example are the same as those in Example 3.

First, a 2-nm-thick C protective layer was obliquely formed. Subsequently, a spin-on-carbon solution was spin-coated on a medium to uniformly form a film having a thickness of 20 nm. In order to remove the solvent in the spin-on-carbon film thus formed, the film was baked on a hot plate at 140° C. for 5 minutes. This was a post-treatment. Continuously, in order to allow the thickened spin-on-carbon film to be thinned, etching using $O_2$ gas as an etchant was performed. Etching was performed by inductively-coupled plasma reactive ion etching under the conditions of gas pressure of 0.1 Pa, antenna power of 40 W, and bias power of 40 W for 15 seconds to thin the spin-on-carbon film. Thus, a medium having a protective layer with a total thickness of 3 nm was obtained.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the measurement height exceeded a flying height of 10 nm which is the standard required to perform the read/write evaluation process. At this time, since the concave portion of the protective layer on the surface of the medium was filled with the spin-on carbon, the roughness was smaller than that of the medium obtained by irradiating the protective layer with light at a single angle, and a medium having a small difference between the convex patterns was obtained.

The surface roughness of a medium was smaller than that of the case where the protective layer was formed at a single irradiation angle, and the hitting of the magnetic head against the surface of the medium could be reduced. The signal/noise ratio of the medium was measured using the spin stand. As a result, a value of 10.8 dB (as the SNR value of the medium) was obtained.

Comparative Example 1

C Protective Layer, Metal Fine Particle Lithography, Protective Layer Thickness of 6 nm Comparative example 1 is an example in the case where the process of obliquely forming a film is performed to form a 6-nm-thick protective layer. In this example, the magnetic recording layer, the mask layer, and the metal fine particle layer as well as the process of transferring the convex pattern to these layers and the peeling process are the same as those of Example 3.

C was used as the protective layer and a film having a thickness of 6 nm was formed by the DC sputtering method at an irradiation angle of 70°.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, with thickening of the protective layer, the hitting of the convex pattern on the surface of the medium against the magnetic head was increased. The measurement height could not exceed a flying height of 10 nm, which is the standard required to perform the read/write evaluation process.

Comparative Example 2

C Protective Layer, Metal Fine Particle Lithography, Protective Layer Thickness of 2 nm, Irradiation Angle of 0 Degree Comparative example 2 is an example in the case where the process of forming a film at an irradiation angle of 0 degree, (i.e., by perpendicular incidence) is performed to from a 2-nm-thick protective layer. In this example, the magnetic recording layer, the mask layer, and the metal fine particle layer as well as the process of transferring the convex pattern to these layers and the peeling process are the same as those of Example 3.

C was used as the protective layer and a film having a thickness of 2 nm was formed by the DC sputtering method at an irradiation angle of 0 degree.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, with enhancing of the convex pattern of the protective layer, the hitting of the convex pattern on the surface of the medium against the magnetic head was increased. The measurement height could not exceed a flying height of 10 nm, which is the standard required to perform the read/write evaluation process.

Comparative Example 3

C Protective Layer, Metal Fine Particle Lithography, Protective Layer Thickness of 2 nm, Irradiation Angle of 20 Degree Comparative example 3 is an example in the case where the process of obliquely forming a film at an irradiation angle of 20 degree is performed to form a 2-nm-thick protective layer. In this example, the magnetic recording layer, the mask layer, and the metal fine particle layer as well as the process of transferring the convex pattern to these layers and the peeling process are the same as those of Example 3.

C was used as the protective layer and a film having a thickness of 6 nm was formed by the DC sputtering method at an irradiation angle of 70 degree.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, with enhancing of the convex pattern of the protective layer, the hitting of the convex pattern on the surface of the medium against the magnetic head was increased. The measurement height could not exceed a flying height of 10 nm, which is the standard required to perform the read/write evaluation process.

Comparative Example 4

C Protective Layer, Metal Fine Particle Lithography, Protective Layer Thickness of 2 nm, Irradiation Angle of 85 Degree Comparative example 4 is an example in the case where the process of obliquely forming a film at an irradiation angle of 85 degree is performed to form a 2-nm-thick protective layer. In this example, the magnetic recording layer, the mask layer, and the metal fine particle layer as well as the process of transferring the convex pattern to these layers and the peeling process are the same as those of Example 3.

C was used as the protective layer material and a film having a thickness of 6 nm was formed by the DC sputtering method at an irradiation angle of 85 degree.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, with enhancing of the convex pattern of the protective layer, the hitting of the convex pattern on the surface of the medium against the magnetic head was increased. The measurement height could not exceed a flying height of 10 nm, which is the standard required to perform the read/write evaluation process.

Comparative Example 5

C Protective Layer, Metal Fine Particle Lithography, Protective Layer Thickness of 2 nm, Irradiation Angle: Changed from 0 to 70 Degree Comparative example 5 is the case where the angle of the oblique film formation in forming a protective layer is gradually changed and is also an example in which the order of the irradiation angle set in Examples 33 to 35 is replaced. In this example, the magnetic recording layer, the mask layer, and the metal fine particle layer as well as the process of transferring the convex pattern to these layers and the peeling process are the same as those of Example 3.

C was used as the protective layer, and the process of forming a film at an irradiation angle of 0 degree, (i.e., by perpendicular incidence) was performed to from a 2-nm-thick protective layer. Thereafter, the process of obliquely forming a film at an irradiation angle of 70 degree was performed to form a protective layer having a total thickness of 3 nm.

After that, similarly to Example 3, a perfluoro polyether-based lubricating film was formed so as to have a thickness of 1.5 nm and a magnetic recording medium having a convex pattern was obtained.

The flying height of the head from the obtained magnetic recording medium was measured with a glide height tester and flying characteristics were evaluated. As a result, the convex pattern of the protective layer formed by the first perpendicular incidence was enhanced by the oblique film formation, the hitting of the convex pattern on the surface of the medium against the magnetic head was increased. The measurement height could not exceed a flying height of 10 nm, which is the standard required to perform the read/write evaluation process.

The results of the examples and comparative examples are shown in Tables 1 and 2.

TABLE 1

| Example | Protective layer material | Protective layer thickness (nm) | Glide evaluation results | SNR (dB) | Processing method |
|---|---|---|---|---|---|
| 1 | C | 2 | 10-nm floating pass | 12.3 | Only mask layer |
| 2 | C | 2 | 10-nm floating pass | 12.1 | Only mask layer |
| 3 | C | 2 | 10-nm floating pass | 12.8 | Only mask layer |
| 4 | C | 2 | 10-nm floating pass | 12.4 | Mask layer/ transfer layer |
| 5 | Al | 2 | 10-nm floating pass | 11 | ↑ |
| 6 | Si | 2 | 10-nm floating pass | 12.1 | ↑ |
| 7 | Ti | 2 | 10-nm floating pass | 10.8 | ↑ |
| 8 | V | 2 | 10-nm floating pass | 11.1 | ↑ |
| 9 | Cr | 2 | 10-nm floating pass | 12 | ↑ |
| 10 | Mn | 2 | 10-nm floating pass | 10.8 | ↑ |
| 11 | Cu | 2 | 10-nm floating pass | 11.2 | ↑ |
| 12 | Zn | 2 | 10-nm floating pass | 12.5 | ↑ |
| 13 | Ge | 2 | 10-nm floating pass | 10.9 | ↑ |
| 14 | Y | 2 | 10-nm floating pass | 11.8 | ↑ |
| 15 | Zr | 2 | 10-nm floating pass | 12.2 | ↑ |
| 16 | Mo | 2 | 10-nm floating pass | 11.6 | ↑ |
| 17 | Pd | 2 | 10-nm floating pass | 12.8 | ↑ |
| 18 | Ag | 2 | 10-nm floating pass | 10.3 | ↑ |
| 19 | Hf | 2 | 10-nm floating pass | 11.2 | ↑ |
| 20 | W | 2 | 10-nm floating pass | 11.5 | ↑ |
| 21 | Pt | 2 | 10-nm floating pass | 12 | ↑ |
| 22 | Au | 2 | 10-nm floating pass | 10.9 | ↑ |
| 23 | C | 3 | 10-nm floating pass | 10.7 | ↑ |
| 24 | C | 4 | 10-nm floating pass | 9.8 | ↑ |
| 25 | C | 2 | 10-nm floating pass | 11.5 | ↑ |
| 26 | C | 2 | 10-nm floating pass | 12.2 | ↑ |

TABLE 2

| Example | Protective layer material | Protective layer thickness (nm) | Glide evaluation results | SNR (dB) | Processing method |
|---|---|---|---|---|---|
| 27 | C | 2 | 10-nm floating pass | 12 | Mask layer/ transfer layer |
| 28 | C | 2 | 10-nm floating pass | 12.4 | ↑ |
| 29 | C | 2 | 10-nm floating pass | 11.4 | ↑ |
| 30 | C | 2 | 10-nm floating pass | 7.2 | ↑ |
| 31 | C | 2 | 10-nm floating pass | 11.6 | ↑ |
| 32 | C | 2 | 10-nm floating pass | 12.8 | ↑ |
| 33 | C | 3 | 10-nm floating pass | 10.5 | ↑ |
| 34 | C | 3 | 10-nm floating pass | 10.7 | ↑ |
| 35 | C | 3 | 10-nm floating pass | 11 | ↑ |
| 36 | C | 40→2 | 10-nm floating pass | 12 | ↑ |
| 37 | C | 10→2 | 10-nm floating pass | 11.6 | ↑ |
| 38 | C | 1→3 | 10-nm floating pass | 11 | ↑ |
| 39 | C | 2→20→3 | 10-nm floating pass | 10.8 | ↑ |
| Comparative Examples | | | | | |
| 1 | C | 6 | 10-nm floating NG | — | Mask layer/ transfer layer |
| 2 | C | 2 | 10-nm floating NG | — | ↑ |
| 3 | C | 2 | 10-nm floating NG | — | ↑ |
| 4 | C | 2 | 10-nm floating NG | — | ↑ |
| 5 | C | 3 | 10-nm floating NG | — | ↑ |

Regarding Examples 1, 25, 26, 27, and 30 and Comparative examples 2 to 4, FIG. 21 shows a graph showing a relationship between an irradiation angle of a film formation material at the time of obliquely forming a protective film and a film thickness of the formed protective film.

The measurement results are shown in Table 3 below.

TABLE 3

| Irradiation angle (°) | Protective layer thickness (nm) | Determination |
|---|---|---|
| 0 | 4.2 | X (no gap) |
| 20 | 3.2 | X (no gap) |
| 40 | 3 | ○ |
| 50 | 2.8 | ○ |
| 60 | 2.7 | ○ |
| 70 | 2.2 | ○ |
| 80 | 2.1 | ○ |
| 85 | 1.4 | X (no gap) |

As shown in Graph 401 and Table 1, the irradiation angle can be 40 to 80 degree. When the irradiation angle is from 40 to 80 degree, the thickness of the protective film is from 2 to 3 nm. In this case, the protective layer material between the dots is formed into a bridge shape, resulting in formation of a gap between the convex-convex patterns. Thus, it is found that if the protective film is formed within the irradiation range, the surface smoothness of the concave-convex pattern can be improved, and the flying characteristics of the head can be improved.

Regarding Examples 1 to 4 and Comparative examples 2 to 5, FIG. 22 shows an example of a graph showing a relationship between a height of a convex portion of a magnetic recording layer and a concentration of material in a protective layer.

The measurement results are shown in Table 4 below.

TABLE 4

| Convexo-concave depth (nm) | Protective layer material concentration (atomic %) |
|---|---|
| 0 | 0 |
| 0.5 | 13 |
| 1.0 | 17 |
| 1.5 | 69 |
| 2.0 | 90 |
| 2.5 | 94 |
| 3.0 | 98 |

As shown in Graph 402 and Table 2, the height of the convex portion of the magnetic recording layer can be 1 to 10 nm. If it is thinner than 1 nm, the thermal fluctuation resistance of the magnetic recording layer is deteriorated. Further, even if a protective film is formed by oblique irradiation, an effect of flattening is hardly obtained. It is found that when the height exceeds 10 nm, the production becomes difficult. The main component concentration of the protective layer material in the surface of the magnetic recording layer shapely increases when the roughness difference between the concave-convex portions is 1 nm or more. Thus, in order to form a gap between convex-convex portions and form a flat protective layer, it is possible that the roughness difference between the concave-convex portions of the magnetic recording layer is 1 nm or more. Further, it is found that the inclination of change of the main component concentration of the protective layer material to the height of the convex portion tends to be larger as the pattern pitch becomes narrower.

The embodiment of the present invention has been hereinabove explained. However, this embodiment is presented as an example, and is not intended to limit the scope of the invention. These new embodiments can be embodied in various other forms, and various kinds of omissions, replacements, and changes can be made without deviating from the gist of the invention. These embodiments and the modifications thereof are included in the scope and the gist of the invention, and are included in the invention described in the claims and the scope equivalent thereto.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic recording medium comprising:
   a substrate;
   a magnetic recording layer having convex-shaped magnetic layers which is formed on the substrate;
   a protective film comprised of a non-magnetic material and formed on the magnetic recording layer; and
   gaps in a region surrounded by the protective film, the surface of the substrate, and each side wall of each magnetic layer.

2. The magnetic recording medium according to claim 1, wherein pitches between centers of the adjacent magnetic layers are 20 nm or less.

3. The magnetic recording medium according to claim 1, wherein a height of the magnetic layer is higher than that of the protective film.

4. The magnetic recording medium according to claim 1, wherein the protective film and the gaps are formed by oblique film formation of a protective film material on the convex-shaped magnetic layer.

5. The magnetic recording medium according to claim 1, wherein the oblique film formation is performed at an angle of 40 to 80° when a direction of light perpendicularly incident on the substrate is 0°.

6. The magnetic recording medium according to claim 1, wherein the thickness of the protective film satisfies the range $t3 \le t2 \le t1$ when the thickness of the protective film is t3 in the case where a distance between the magnetic layers adjacent to each other is the longest distance, and the thickness of the protective film is t2 in the case where a distance between the magnetic layers adjacent to each other is the longest distance.

7. The magnetic recording medium according to claim 1, wherein the magnetic layers have any of cylindrical, prismatic, conical, and pyramidal shapes.

8. The magnetic recording medium according to claim 1, wherein a major element of the protective film formed between the magnetic layers has a concentration distribution in a thickness direction and the protective film formed on the magnetic layers has a higher concentration of major element than that of the protective film formed between the magnetic layers.

9. A magnetic recording/reproducing device comprising:
   a magnetic recording medium which includes a substrate;
   a magnetic recording layer having convex-shaped magnetic layers which is formed on the substrate;
   a protective film comprised of a non-magnetic material and formed on the magnetic recording layer, and gaps in a region surrounded by the protective film, the surface of the substrate, and each side wall of each magnetic layer; and
   a read/write head.

10. The magnetic recording/reproducing device according to claim 9, wherein pitches between centers of the adjacent magnetic layers are 20 nm or less.

11. The magnetic recording/reproducing device according to claim 9, wherein a height of the magnetic layer is higher than that of the protective film.

12. The magnetic recording/reproducing device according to claim 9, wherein the protective film and the gaps are formed by oblique film formation of a protective film material on the convex-shaped magnetic layer.

13. The magnetic recording/reproducing device according to claim 9, wherein the oblique film formation is performed at an angle of 40 to 80° when a direction of light perpendicularly incident on the substrate is 0°.

14. The magnetic recording/reproducing device according to claim 9, wherein the thickness of the protective film satisfies the range $t3 \le t2 \le t1$ when the thickness of the protective film is t3 in the case where a distance between the magnetic layers adjacent to each other is the longest distance, and the thickness of the protective film is t2 in the case where a distance between the magnetic layers adjacent to each other is the longest distance.

15. The magnetic recording/reproducing device according to claim 9, wherein the magnetic layers have any of cylindrical, prismatic, conical, and pyramidal shapes.

16. The magnetic recording/reproducing device according to claim 9, wherein the major element of the protective film formed between the magnetic layers has a concentration distribution in a thickness direction and the protective film formed on the magnetic layers has a higher concentration of major element than that of the protective film formed between the magnetic layers.

17. A method for producing a magnetic recording medium comprising:
  forming a magnetic recording layer on a substrate;
  patterning the magnetic recording layer to form a magnetic recording layer having convex-shaped magnetic layers; and
  forming a protective film on the magnetic recording layer by oblique film formation of a protective film material on the convex pattern of the magnetic recording layer and providing gaps in a region surrounded by the protective film, the surface of the substrate, and each side wall of each magnetic layer;
  wherein the oblique film formation is performed on the substrate at an angle of 40 to 80° when a direction of light perpendicularly incident on the substrate is 0°.

18. The method for producing a magnetic recording medium according to claim 17, wherein the patterning the magnetic recording layer comprises:
  forming a mask layer on the magnetic recording layer;
  forming a resist layer on the mask layer; patterning the resist layer to provide a convex pattern;
  transferring the convex pattern to the mask layer;
  transferring the convex pattern to the magnetic recording layer to form a magnetic recording layer having convex-shaped magnetic layers; and
  removing the mask layer from the top of the magnetic recording layer.

19. The method for producing a magnetic recording medium according to claim 17, wherein the patterning the magnetic recording layer comprises:
  forming a mask layer on the magnetic recording layer;
  forming a metal fine particle layer comprised of a plurality of metal fine particles on the mask layer;
  transferring a convex pattern comprised of the metal fine particle layer to the mask layer;
  transferring the convex-shaped pattern to the magnetic recording layer to from a magnetic recording layer having convex-shaped magnetic layers; and
  removing the mask layer from the magnetic recording layer.

20. The method for producing a magnetic recording medium according to claim 17, wherein the metal fine particles are coated with a protective coating, and
  the method further comprises, before transferring a convex-shaped pattern comprised of the metal fine particle layer to the mask layer, forming an overcoat layer on the surface of the metal fine particle layer and irradiating the metal fine particle layer with energy beams through the overcoat layer to deactivate the protective coating.

* * * * *

UNITED STATES PATENT AND TRADEMARK OFFICE
CERTIFICATE OF CORRECTION

PATENT NO. : 8,995,089 B2  
APPLICATION NO. : 13/944645  
DATED : March 31, 2015  
INVENTOR(S) : Kazutaka Takizawa et al.

Page 1 of 1

It is certified that error appears in the above-identified patent and that said Letters Patent is hereby corrected as shown below:

Claims

In Column 58, at line 14, in Claim 6, change "$t3 \leq t2 \leq t1$" to --$t1 \leq t2 \leq t3$--.

In Column 58, at line 18, in Claim 6, change "longest" to --closest--.

In Column 58, at line 55, in Claim 14, change "$t3 \leq t2 \leq t1$" to --$t1 \leq t2 \leq t3$--.

In Column 58, at line 60, in Claim 14, change "longest" to --closest--.

Signed and Sealed this  
Seventeenth Day of November, 2015

Michelle K. Lee  
*Director of the United States Patent and Trademark Office*